US008988031B2

(12) United States Patent
Bates et al.

(10) Patent No.: US 8,988,031 B2
(45) Date of Patent: Mar. 24, 2015

(54) DYNAMIC CONFIGURATION OF A CALCULATION FUNCTION THAT OPTIMIZES DYNAMIC RECONFIGURATION-SWITCHING OF WINDINGS IN AN ELECTRIC MOTOR

(75) Inventors: Allen Keith Bates, Tucson, AZ (US);
Nhan Xuan Bui, Tucson, AZ (US);
Reed Alan Hancock, Tucson, AZ (US);
Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 13/614,915

(22) Filed: Sep. 13, 2012

(65) Prior Publication Data
US 2013/0002183 A1    Jan. 3, 2013

Related U.S. Application Data

(63) Continuation-in-part of application No. 12/202,854, filed on Sep. 2, 2008.

(51) Int. Cl.
*H02P 25/18* (2006.01)
*H02P 27/08* (2006.01)
*H02P 23/00* (2006.01)

(52) U.S. Cl.
CPC ............... *H02P 25/18* (2013.01); *H02P 27/08* (2013.01); *H02P 25/188* (2013.01); *H02P 23/0063* (2013.01)
USPC ............................ 318/495; 318/496; 318/497

(58) Field of Classification Search
USPC ........................................ 318/494–498, 561
See application file for complete search history.

(56) References Cited

U.S. PATENT DOCUMENTS

| | | | |
|---|---|---|---|
| 1,467,745 | A | 9/1923 | Zederbohm |
| 3,571,801 | A | 3/1971 | Coolidge et al. |
| 3,876,168 | A | 4/1975 | Powers, Jr. |
| 3,876,923 | A | 4/1975 | Humphrey et al. |
| 3,916,257 | A | 10/1975 | Harper, Jr. |
| 4,059,245 | A | 11/1977 | Hirose |
| 4,167,692 | A | 9/1979 | Sekiya et al. |
| 4,357,542 | A | 11/1982 | Kirschbaum |
| 4,477,760 | A | 10/1984 | Kuznetsov |
| 4,513,229 | A | 4/1985 | Kudelski |
| 4,642,536 | A | 2/1987 | Boyd, Jr. et al. |
| 4,675,591 | A | 6/1987 | Pleiss |
| 4,691,155 | A | 9/1987 | Taylor et al. |
| 4,736,147 | A | 4/1988 | Shizhang |
| 4,801,853 | A | 1/1989 | Lewis et al. |

(Continued)

FOREIGN PATENT DOCUMENTS

| | | |
|---|---|---|
| EP | 0814473 A2 | 12/1997 |
| EP | 0873587 B1 | 10/1998 |

(Continued)

*Primary Examiner* — Brentsu Ro
(74) *Attorney, Agent, or Firm* — Griffiths & Seaton PLLC

(57) ABSTRACT

A calculation function, which optimizes a dynamic reconfiguration-switching of motor windings between winding-configurations, is dynamically configured. Acceleration is traded off in favor of higher velocity upon detecting the electric motor is at an optimal angular-velocity for switching to an optimal lower torque constant and voltage constant. The total back electromotive force (BEMF) is prohibited from inhibiting further acceleration to a higher angular-velocity.

21 Claims, 28 Drawing Sheets

(56) References Cited

U.S. PATENT DOCUMENTS

| | | | |
|---|---|---|---|
| 4,890,049 A | 12/1989 | Auinger | |
| 5,068,587 A | 11/1991 | Nakamura | |
| 5,124,860 A | 6/1992 | Czonka | |
| 5,216,343 A | 6/1993 | Genheimer et al. | |
| 5,352,964 A | 10/1994 | Nakamura et al. | |
| 5,406,190 A | 4/1995 | Rosenberg | |
| 5,442,250 A | 8/1995 | Stridsberg | |
| 5,614,799 A | 3/1997 | Anderson et al. | |
| 5,687,075 A * | 11/1997 | Stothers | 700/28 |
| 5,818,195 A | 10/1998 | Frick et al. | |
| 5,821,660 A | 10/1998 | Anderson | |
| 5,912,522 A * | 6/1999 | Rivera | 310/184 |
| 5,982,123 A * | 11/1999 | Hornung et al. | 318/443 |
| 6,215,261 B1 | 4/2001 | Becerra | |
| 6,400,039 B1 | 6/2002 | Wobben | |
| 6,727,668 B1 | 4/2004 | Maslov et al. | |
| 7,091,691 B2 | 8/2006 | Min et al. | |
| 7,102,307 B2 | 9/2006 | Shao | |
| 7,141,949 B2 | 11/2006 | Harwood | |
| 7,400,071 B2 * | 7/2008 | Adra | 310/68 B |
| 7,977,842 B2 * | 7/2011 | Lin | 310/184 |
| 8,704,474 B2 * | 4/2014 | Li et al. | 318/400.34 |

FOREIGN PATENT DOCUMENTS

| | | |
|---|---|---|
| TW | 081103623 B | 1/1993 |
| WO | 9725767 A1 | 7/1997 |

\* cited by examiner

Derivation of Optimal Switching Algorithm, for 3 Winding Configurations, with N=3.

| Voltage Constant and Torque Constant | Angular Acceleration | Delta Angular Velocity | Total Angular Velocity | Delta Time |
|---|---|---|---|---|
| K | A | V | V | V/A |
| K/X | A/X | XV - V = (X-1)V | XV | X*(X-1)*(V/A) |
| K/3 | A/3 | 3V - XV = (3-X)V | 3V | 3(3-X)(V/A) |

FIG. 7

Profile of Optimal Switching Algorithm (Figure 7 with X = 2)

| Voltage Constant and Torque Constant | Angular Acceleration | Delta Angular Velocity | Total Angular Velocity | Delta Time |
|---|---|---|---|---|
| K | A | V | V | (V/A) = T |
| K/2 | A/2 | V | XV = 2V | 2(V/A) = 2T |
| K/3 | A/3 | V | 3V | 3(V/A) = 3T (giving a total time is 6T to ramp up to an angular velocity of 3V) |

Voltage Constant Used as a function of Winding-Configuration Number WC

| State "WC" | Voltage Constant = Torque Constant = K/WC | Angular Acceleration = A/WC | Time when State "WC" is in effect |
|---|---|---|---|
| 1 | K | A | 0 to T |
| 2 | K/2 | A/2 | T to 3T |
| 3 | K/3 | A/3 | 3T to 6T |

Derivation of Optimal Switching Algorithm, for 5 Winding Configurations, with N=3.

| Voltage Constant and Torque Constant | Angular Acceleration | Delta Angular Velocity | Total Angular Velocity | Delta Time |
|---|---|---|---|---|
| K | A | V | V | V/A |
| K/X | A/X | XV − V = (X−1)V | XV | X*(X−1)*(V/A) |
| K/Y | A/Y | YV − XV = (Y−X)V | YV | Y*(Y−X)(V/A) |
| K/Z | A/Z | ZV − YV = (Z−Y)V | ZV | Z*(Z−Y)*(V/A) |
| K/3 | A/3 | 3V − ZV = (3−Z)V | 3V | 3*(3−Z)*(V/A) |

FIG. 11

Profile of Optimal Switching Algorithm (Figure 11 with X = 3/2, Y = 2, and Z = 5/2)

| Voltage Constant and Torque Constant | Angular Acceleration | Delta Angular Velocity | Total Angular Velocity | Delta Time |
|---|---|---|---|---|
| K | A | V | V | T where T = V/A |
| 2K/3 | 2A/3 | V/2 | 3V/2 | 3T/4 |
| K/2 | A/2 | V/2 | 2V | T |
| 2K/5 | 2A/5 | V/2 | 5V/2 | 5T/4 |
| K/3 | A/3 | V/2 | 3V | 3T/2 (giving a total time of 11T/2 to ramp up to an angular velocity of 3V) |

FIG. 12

Voltage Constant Used as a function of Winding-Configuration Number WC

| State "WC" | Voltage Constant and Torque Constant | Angular Acceleration | Maximum Angular Velocity | Time when State "WC" is in effect |
|---|---|---|---|---|
| 1 | K | A | V | 0 to T |
| 2 | 2K/3 | 2A/3 | 3V/2 | T to 7T/4 |
| 3 | K/2 | A/2 | 2V | 7T/4 to 11T/4 |
| 4 | 2K/5 | 2A/5 | 5V/2 | 11T/4 to 4T |
| 5 | K/3 | A/3 | 3V | 4T to 11T/2 |

FIG. 13

Derivation of Optimal Switching Algorithm, for 2 Winding Configurations, with N=3.

| State "WC" | Voltage Constant and Torque Constant | Angular Acceleration | Maximum Angular Velocity | Time when State "WC" is in effect |
|---|---|---|---|---|
| 1 | K | A | V | 0 to T |
| 2 | K/3 | A/3 | 3V | T to 7T |

FIG. 14

Derivation of Optimal Switching Algorithm, for 4 Winding Configurations, with N=3.

| Voltage Constant and Torque Constant | Angular Acceleration | Delta Angular Velocity | Total Angular Velocity | Delta Time |
|---|---|---|---|---|
| K | A | V | V | V/A |
| K/X | A/X | XV - V = (X-1)V | XV | X*(X-1)*(V/A) |
| K/Y | A/Y | YV - XV = (Y-X)V | YV | Y*(Y-X)*(V/A) |
| K/3 | A/3 | 3V - YV = (3-Y)V | 3V | 3*(3-Y)*(V/A) |

FIG. 15

Profile of Optimal Switching Algorithm (Figure 15 with X = 5/3, Y = 7/3)

| Voltage Constant and Torque Constant | Angular Acceleration | Delta Angular Velocity | Total Angular Velocity | Delta Time |
|---|---|---|---|---|
| K | A | V | V | T where T=V/A |
| 3K/5 | 3A/5 | 2V/3 | 5V/3 | 10T/9 |
| 3K/7 | 3A/7 | 2V/3 | 7V/3 | 14T/9 |
| K/3 | A/3 | 2V/3 | 3V | 2T (giving a total time of 51T/9 to ramp up to an angular velocity of 3V) |

FIG. 16

Four-Winding-Configuration motor

| State "WC" | Voltage Constant | Angular Acceleration | Maximum Angular Velocity | Time when State "WC" is in effect |
|---|---|---|---|---|
| 1 | K | A | V | 0 to T |
| 2 | 3K/5 | 3A/5 | 5V/3 | T to 19T/9 |
| 3 | 3K/7 | 3A/7 | 7V/3 | 19T/9 to 33T/9 |
| 4 | K/3 | A/3 | 3V | 33T/9 to 51T/9 |

Table of the total time to ramp up to an angular velocity of 3V versus the total number of available winding-configurations, where T= V/A

| Total Number of Winding-Configurations (WC) | Total Time to Ramp up to 3V | In Decimal Form |
|---|---|---|
| 1 | 9T | 9T |
| 2 | 7T | 7T |
| 3 | 6T | 6T |
| 4 | 51T/9 | 5.67T |
| 5 | 11T/2 | 5.5T |

Graph of the total time to ramp up to an angular velocity of 3V versus the total number of available winding-configurations, where T= V/A Derivation of 3-Winding-Configuration Optimal Switching Algorithm for NV final speed

| Voltage Constant and Torque Constant | Angular Acceleration | Delta Angular Velocity | Total Angular Velocity | Delta Time |
|---|---|---|---|---|
| K | A | V | V | V/A |
| K/X | A/X | XV - V = (X-1)V | XV | X*(X-1)*(V/A) |
| K/N | A/N | NV - XV = (N-X)V | NV | N(N-X)(V/A) |

Derivation of the (m+2)-Winding-Configuration Optimal Switching Algorithm for a final velocity of NV (where V is the maximum angular velocity for the full voltage and torque constant K).

| Voltage Constant and Torque Constant | Angular Acceleration | Delta Angular Velocity | Total Angular Velocity | Delta Time |
|---|---|---|---|---|
| K | A | V | V | V/A |
| $K/X_1$ | $A/X_1$ | $X_1V - V = (X_1-1)V$ | $X_1V$ | $X_1*(X_1-1)*(V/A)$ |
| $K/X_2$ | $A/X_2$ | $X_2V - X_1V = (X_2-X_1)V$ | $X_2V$ | $X_2*(X_2-X_1)*(V/A)$ |
| $K/X_3$ | $A/X_3$ | $X_3V - X_2V = (X_3-X_2)V$ | $X_3V$ | $X_3*(X_3-X_2)*(V/A)$ |
| $K/X_m$ | $A/X_m$ | $X_mV - X_{m-1}V = (X_m-X_{m-1})V$ | $X_{m-1}V$ | $X_m*(X_m-X_{m-1})*(V/A)$ |
| $K/N$ | $A/N$ | $NV - X_mV = (N-X_m)V$ | $NV$ | $N*(N-X_m)*(V/A)$ |

FIG. 21

$[A]\{x\} = \{b\}$ set of m linear equations and m unknowns $$\begin{bmatrix} 2 & -1 & & & & & \\ -1 & 2 & -1 & & & & \\ & -1 & 2 & -1 & & & \\ & & \ddots & \ddots & \ddots & & \\ & & & -1 & 2 & -1 & \\ & & & & -1 & 2 & -1 \\ & & & & & -1 & 2 \end{bmatrix} \begin{Bmatrix} X(1) \\ X(2) \\ X(3) \\ X(4) \\ \vdots \\ X(m-1) \\ X(m) \end{Bmatrix} = \begin{Bmatrix} 1 \\ 0 \\ 0 \\ 0 \\ \vdots \\ 0 \\ N \end{Bmatrix}$$

Tridiagonal Coefficient Matrix [A]   Unknowns {x}   Right Hand Side {b}

Main Diagonal all 2's
Adjacent Diagonals all -1s
All other elements are zero

Profile of Optimal Switching Algorithm: Figure 20 with X = (N+1)/2

| Voltage Constant and Torque Constant | Angular Acceleration | Delta Angular Velocity | Total Angular Velocity | Delta Time |
|---|---|---|---|---|
| K | A | V | V | T |
| 2K/(N+1) | 2A/(N+1) | (N-1)V/2 | (N+1)V/2 | $(N^2-1)T/4$ |
| K/N | A/N | (N-1)V/2 | NV | $(N^2-N)T/2$ |

FIG. 23

Brushless DC Motor/Electric Motor – 3 Phases

DYNAMIC CONFIGURATION OF A CALCULATION FUNCTION THAT OPTIMIZES DYNAMIC RECONFIGURATION-SWITCHING OF WINDINGS IN AN ELECTRIC MOTOR

CROSS-REFERENCE TO RELATED APPLICATION

This application is a continuation in part, and claims priority to copending U.S. application Ser. No. 12/202,854, filed Sep. 2, 2008, now Published U.S. Application 2010/0052584A1, the entire contents of which is incorporated herein by reference and is relied upon for claiming the benefit of priority.

BACKGROUND OF THE INVENTION

1. Field of the Invention

The present invention generally relates to the field of data tape transport devices. The present invention specifically relates to optimizing dynamic reconfiguration-switching of motor windings in an electric motor.

2. Description of the Related Art

Magnetic tape provides a means for physically storing data. As an archival medium, tape often comprises the only copy of the data. Tape may be used to restore data lost in a disk-drive crash. A tape drive is used to store and retrieve data with respect to the magnetic tape. An example of a tape drive is the IBM TotalStorage Enterprise Tape Drive 3592 manufactured by IBM Corporation. Tape drives are typically used in combination with an automated data storage library. For example, the IBM TotalStorage Enterprise Tape Library 3494 manufactured by IBM Corporation is an automated data storage library that may include one or more tape drives and data storage media for storing data with respect to the tape drives.

Tape drives frequently employ DC motors and feedback control systems with motor drivers for operating the DC motors, to produce well-controlled motion parameters such as position, velocity, and tape tension. While the motors rotate, a back electromotive force ("BEMF") is produced by the tape drive electric motors. This BEMF voltage is produced because the electric motors generate an opposing voltage while rotating.

In tape drives such as the aforementioned IBM 3592 used in the Enterprise range, and the Linear Tape Open used in the mid-range, the current tape linear velocity is limited by the tape reel's angular-velocity. The tape reel's angular-velocity approaches a maximum when the BEMF produced by the reel motor approaches the voltage of the power supply to the reel motors. Tape drives typically operate from +5 and +12 V power supplies; therefore it is not possible to increase the power supply voltage to increase the tape reel angular-velocity. In light of the foregoing, a need exists for a mechanism by which tape reel angular-velocity may be increased in tape transport systems incorporating fixed-voltage power supplies.

SUMMARY OF THE INVENTION

While it is not possible to increase power supply voltage to increase tape reel angular-velocity in tape transport systems implementing a fixed-voltage power supply, it is possible to decrease the BEMF in order to increase the tape reel angular-velocity by reducing the torque constant and voltage constant of the reel motor. However, reducing the torque constant of the reel motor decreases the tape reel angular-acceleration, thereby impacting performance. The present invention discloses apparatus and method embodiments of mechanisms to selectively either reduce the BEMF from the reel motor, therefore increasing the allowable tape reel angular-velocity for a fixed power supply voltage, or maintain a higher tape reel angular-acceleration. By use of the following mechanism, either the tape linear velocity or tape linear acceleration may be selectively increased relative to present implementations.

Accordingly, and in view of the foregoing, various exemplary method, system, and computer program product embodiments for dynamically configuring a calculation function that optimizes a dynamic and optimal reconfiguration-switching of motor windings are provided. In one embodiment, by way of example only, a calculation function, which optimizes a dynamic reconfiguration-switching of motor windings between winding-configurations, is dynamically configured. Acceleration is traded off in favor of higher velocity upon detecting the electric motor is at an optimal angular-velocity for switching to an optimal lower torque constant and voltage constant. The total back electromotive force (BEMF) is prohibited from inhibiting further acceleration to a higher angular-velocity.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a table diagram illustrating an exemplary derivation of the optimal switching calculation for optimizing a dynamic reconfiguration-switching between individual motor windings and dynamically switching between a 3-winding-configuration motor for trading off angular-acceleration in favor of increased angular-velocity between each successive winding-configuration, with N=3;

FIG. 8 is a table diagram illustrating an exemplary profile of the optimal switching calculation for optimizing a dynamic reconfiguration-switching between individual motor windings in a 3-winding-configuration motor for trading off angular-acceleration in favor of increased angular-velocity between each successive winding-configuration;

FIG. 9 is a table diagram illustrating an exemplary operation for optimizing the dynamic reconfiguration-switching using a voltage constant as a function of the winding-configuration number "WC" using 3 winding-configurations;

FIG. 11 is a table diagram illustrating an exemplary derivation of the optimal switching calculation for optimizing a dynamic reconfiguration-switching between individual motor windings and dynamically switching between a 5-winding-configuration motor for trading off angular-acceleration in favor of increased angular-velocity between each successive winding-configuration, with N=3;

FIG. 12 is a table diagram illustrating an exemplary profile of the optimal switching calculation for optimizing a dynamic reconfiguration-switching between individual motor windings in a 5-winding-configuration motor for trading off angular-acceleration in favor of increased angular-velocity between each successive winding-configuration;

FIG. 13 is a table diagram illustrating an exemplary operation for optimizing the dynamic reconfiguration-switching using a voltage constant as a function of the winding-configuration number "WC" using 5 winding-configurations;

FIG. 14 is a table diagram illustrating an exemplary operation for optimizing the dynamic reconfiguration-switching using a voltage constant as a function of the winding-configuration number "WC" using 2 winding-configurations, with N=3;

FIG. 15 is a table diagram illustrating an exemplary derivation of the optimal switching calculation for optimizing a dynamic reconfiguration-switching between individual motor windings and dynamically switching between a 4-winding-configuration motor for trading off angular-acceleration in favor of increased angular-velocity between each successive winding-configuration, with N=3;

FIG. 16 is a table diagram illustrating an exemplary profile of the optimal switching calculation for optimizing a dynamic reconfiguration-switching between individual motor windings in a 4-winding-configuration motor for trading off angular-acceleration in favor of increased angular-velocity between each successive winding-configuration;

FIG. 17 is an additional table diagram illustrating an exemplary operation for optimizing the dynamic reconfiguration-switching using a voltage constant as a function of the winding-configuration number "WC" using 4 winding-configurations;

FIG. 18 is a table diagram summarizing FIGS. 7-17 in terms of the total time to ramp up to an angular velocity of 3V versus the total number of available winding-configurations, where T=V/A;

FIG. 20 is a table diagram illustrating an exemplary derivation of a 3-winding-configuration optimal switching algorithm for a final speed of NV, where V is the maximum angular-velocity for the full voltage and torque constant K, and N is an arbitrary multiplicative factor;

FIG. 21 is a table diagram illustrating an exemplary derivation of a (m+2)-winding-configuration optimal switching algorithm for a final velocity of NV, where V is the maximum angular-velocity for the full voltage and torque constant K, and N is an arbitrary multiplicative factor;

FIG. 22 is a matrix diagram illustrating an exemplary tridiagonal coefficient matrix [A];

FIG. 23 is a table diagram illustrating an exemplary profile of the optimal switching calculation for optimizing a dynamic reconfiguration-switching between individual motor windings in a 3-winding-configuration motor for trading off angular-acceleration in favor of increased angular-velocity between each successive winding-configuration where X=(N+1)/2;

DETAILED DESCRIPTION OF THE DRAWINGS

The illustrated embodiments below provide mechanisms for increasing maximum angular-velocity in an electric motor by use of a motor control switching circuit. The motor control switching circuit reduces the total Back-EMF (BEMF) produced by the motor by bypassing a portion of the motor coils when high angular-velocity is needed. Although bypassing a portion of the motor coils reduces the angular-acceleration capability of the motor because the torque constant of the motor is reduced in the effort to reduce the voltage constant of the motor, the motor control switching circuit is able to produce the necessary angular-acceleration when needed by switching in the previously bypassed motor coils.

Figure 1:
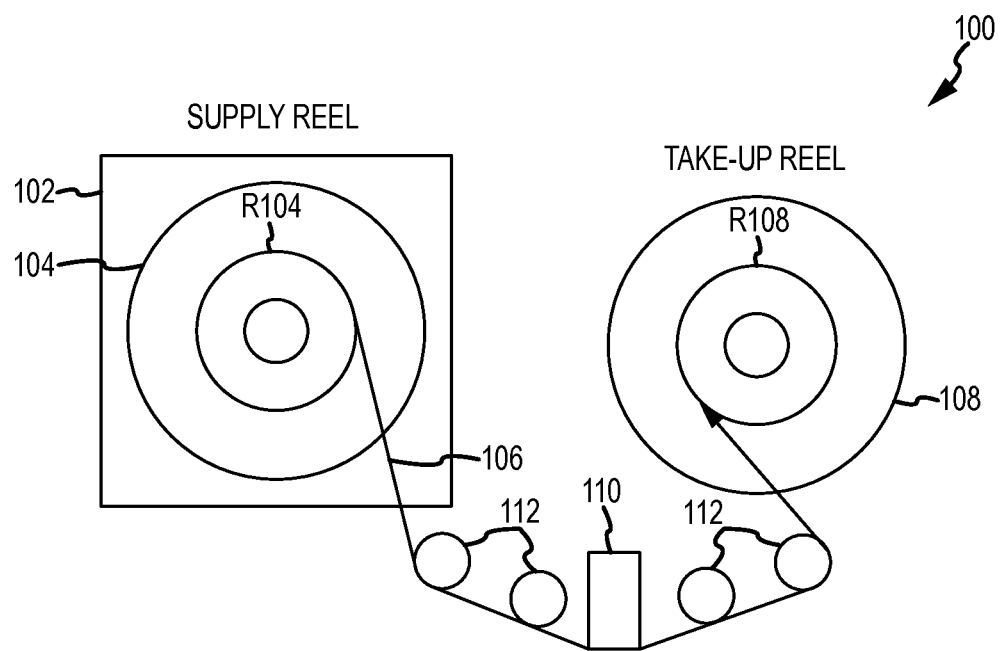
FIG. 1 is a diagram illustrating the tape path in a tape transport system.

FIG. 1 is a diagram illustrating the tape path of an exemplary tape transport system 100. The tape transport system 100 illustrated in FIG. 1 accepts a tape cartridge 102 containing first tape reel 104 on which is wound a length of tape 106. The tape transport system 100 includes a second tape reel 108, at least one tape head 110 and guide rollers 112. Tape head 110 may have Anisotropic Magneto-Resistive (AMR), Giant Magneto-Resistive (GMR), or Tunnel Magneto-Resistive (TMR) read elements to read data and manufacturer written servo information from tape 106, and Thin Film (TF) write elements for writing data to tape 106. When the cartridge 102 is inserted into the tape transport system 100, the tape 106 is automatically threaded around the rollers 112, across the tape head 110 and onto the second tape reel 108.

Motors (not shown) operatively coupled to the reels 104 and 108 pull the tape 106 across the tape head 110 which reads/writes information to/from the tape in a known manner. The motors may also move the tape 106 from one reel to another at high speed in fast forward and rewind operations. The motors may be directly coupled to first tape reel, 104 and second tape reel, 108 or there may be a mechanical drive system between the reels and the motor(s). Whether directly coupled or coupled through a mechanical drive system, the type of coupling determines a mechanical relationship between the motor(s) and the tape reels. The mechanical drive system could be for example, gears, belts, pulleys, clutches, etc.

All tape operations may occur with the tape 106 moving in either direction, due to the serpentine format of the tape 106. Thus, either first tape reel 104 or 108 may serve as the supply reel or the take-up reel, depending upon the direction of the tape 106. In FIG. 1, the first tape reel 104 within the cartridge 102 is shown serving as the tape supply reel while the second tape reel 108 is shown serving as the take-up reel. In the following description, the term "supply reel" refers to the reel operating as the supply reel at the present time and the term "take up reel" refers to the reel operating as the take-up reel at the present time. In an alternate embodiment, the supply reel refers to the reel inside of the removable tape-cartridge. Moreover, the terms "supply motor" and "take-up motor" refer to the motors operatively coupled to the supply and take-up reels, respectively. The type of tape transport system 100 shown in FIG. 1 is for illustrative purposes only and the invention may be employed with other types of transport systems.

Typically, tape 106 moves at a constant linear velocity VTAPE across head 110. Hence, as the radius of the outer wrap of tape R104 and R108, of reels 104 and 108, changes, the angular-velocity W104 and W108 of reels 104 and 108 also change, per equation (1). Also, as VTAPE increases, such as during a high speed search, W104 and W108 increase per the following relationship:

$$W104*R104=W108*R108=VTAPE \quad (1).$$

Per equation (1) above, as the radius of one reel shrinks to its minimum, which is at beginning-of-tape (BOT) for reel 108 and end-of-tape (EOT) for reel 104, that is where the respective motor is spinning at its maximum angular-velocity and generates the maximum BEMF. This maximum BEMF is further increased as VTAPE is increased from the normal data I/O velocity to the high-speed search velocity. BEMF is the angular-velocity W of a reel motor multiplied by the voltage constant Kvoltage of the motor, which is equal to the torque constant Ktorque of the motor when SI (metric) units are employed. It is the enclosed invention, which reduces these two constants by using selective switching to bypass motor coils, in order to reduce the BEMF:

$$BEMF = K\text{voltage}*W \quad (2).$$

The rotational acceleration capability of the motor is reduced per equation (3) when selectively bypassing motor coils because the torque constant Ktorque of the motor is reduced at the same time that the voltage constant Kvoltage is reduced. Reduction of the torque constant Ktorque reduces the torque provided by the motor, and that torque divided by the rotational inertia of the motor and tape reel gives the rotational acceleration of the motor and tape reel, equation (4). However, these bypassed coils may be selectively re-engaged when that higher acceleration (or deceleration) is desired, preferably when the angular-velocity of the motor is in the range that permits an increase in back-EMF (BEMF).

$$\text{Torque} = K\text{torque}*\text{Motor\_Current} \quad (3).$$

$$\text{Rotational Acceleration} = \text{Torque}/(\text{Rotational Inertia of Motor+Reel}) \quad (4).$$

Figure 2:
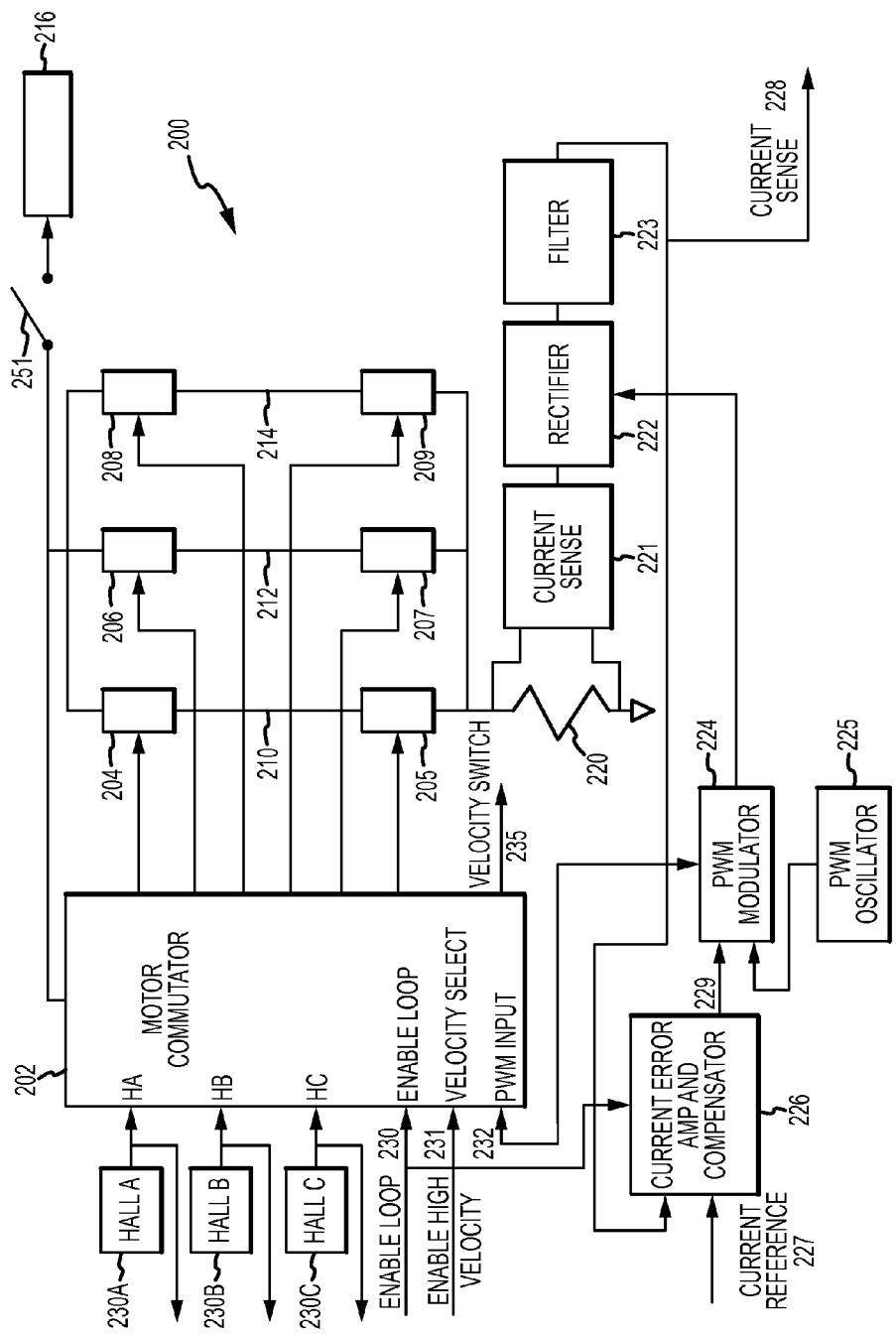
FIG. 2 is a block diagram of a motor control or driver circuit.

FIG. 2 is a block diagram of a motor control or driver circuit 200 for brushless DC motors coupled to the reels 104 and 108 for operation of the disclosed invention. A commutator 202 provides gate control for a set of power switches, such as FET switches 204, 205, 206, 207, 208 and 209, which, in turn, connect/disconnect the motor windings 210, 212 and 214 to/from a motor power supply 216 using switch 251. Sense resistor 220, current sense 221, rectifier 222 and filter 223 provide current sense signal 228 to current error amp and compensator 226.

Figure 4:
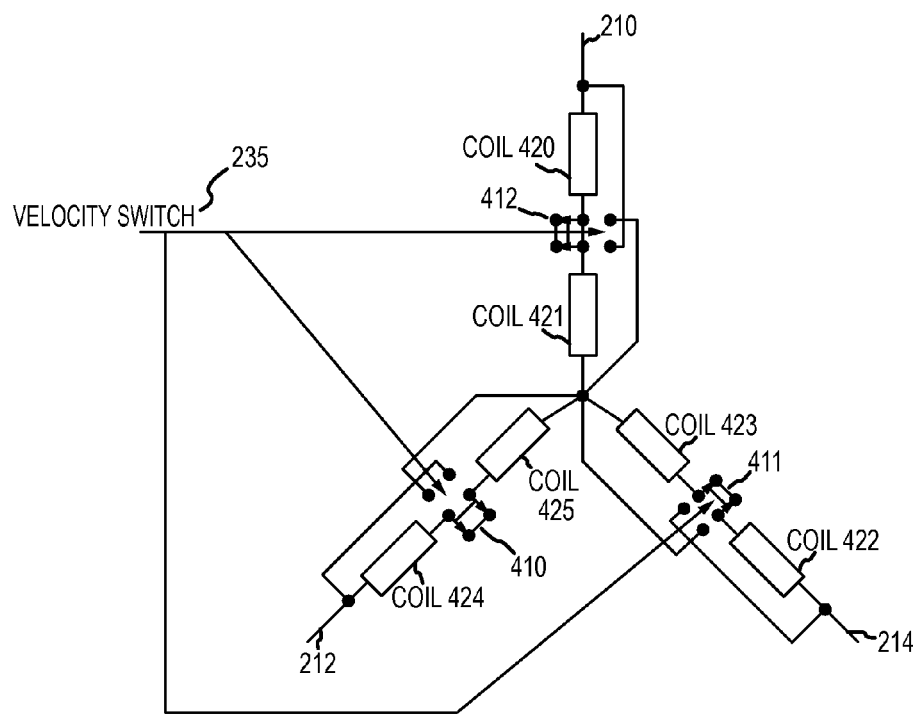
FIG. 4 is a first embodiment of motor coils with winding switches.
Figure 5:
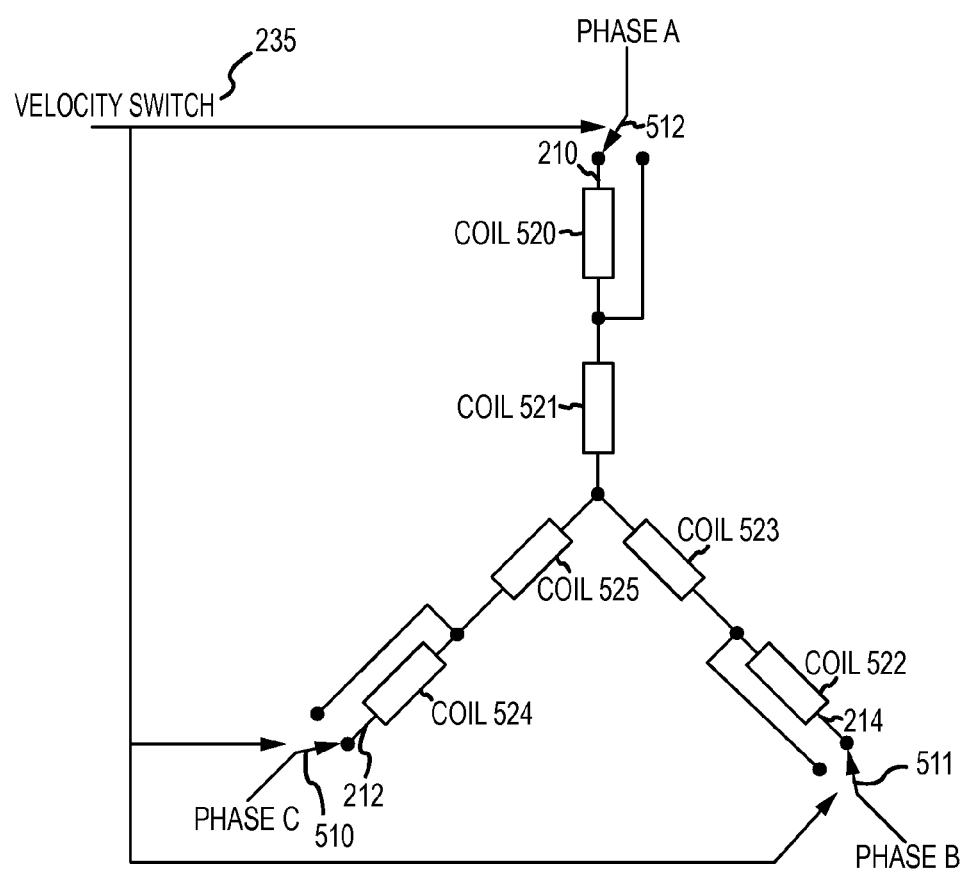
FIG. 5 is a second embodiment of motor coils with winding switches.

Current error amp and compensator 226 compares current sense signal 228 to current reference 227 and provides an error signal 229 to Pulse Width Modulation (PWM) modulator 224. Current error amp and compensator 226 also provides servo loop compensation to ensure a stable feedback loop for PWM modulator 224. Commutator 202 accepts hall sensor inputs HA, HB, HC from hall sensors 203A, 203B, and 203C, respectively. Commutator 202 also accepts enable loop 230, Enable high velocity 231 which provides Velocity select input, PWM input 232 to control the reel motors 306 and 308 (FIG. 3) using FET switches 204, 205, 206, 207, 208 and 209. Velocity switch output 235 controls velocity switches 410, 411, and 412 (FIGS. 4, 5). PWM oscillator 225 also provides input to PWM 224.

Figure 3:
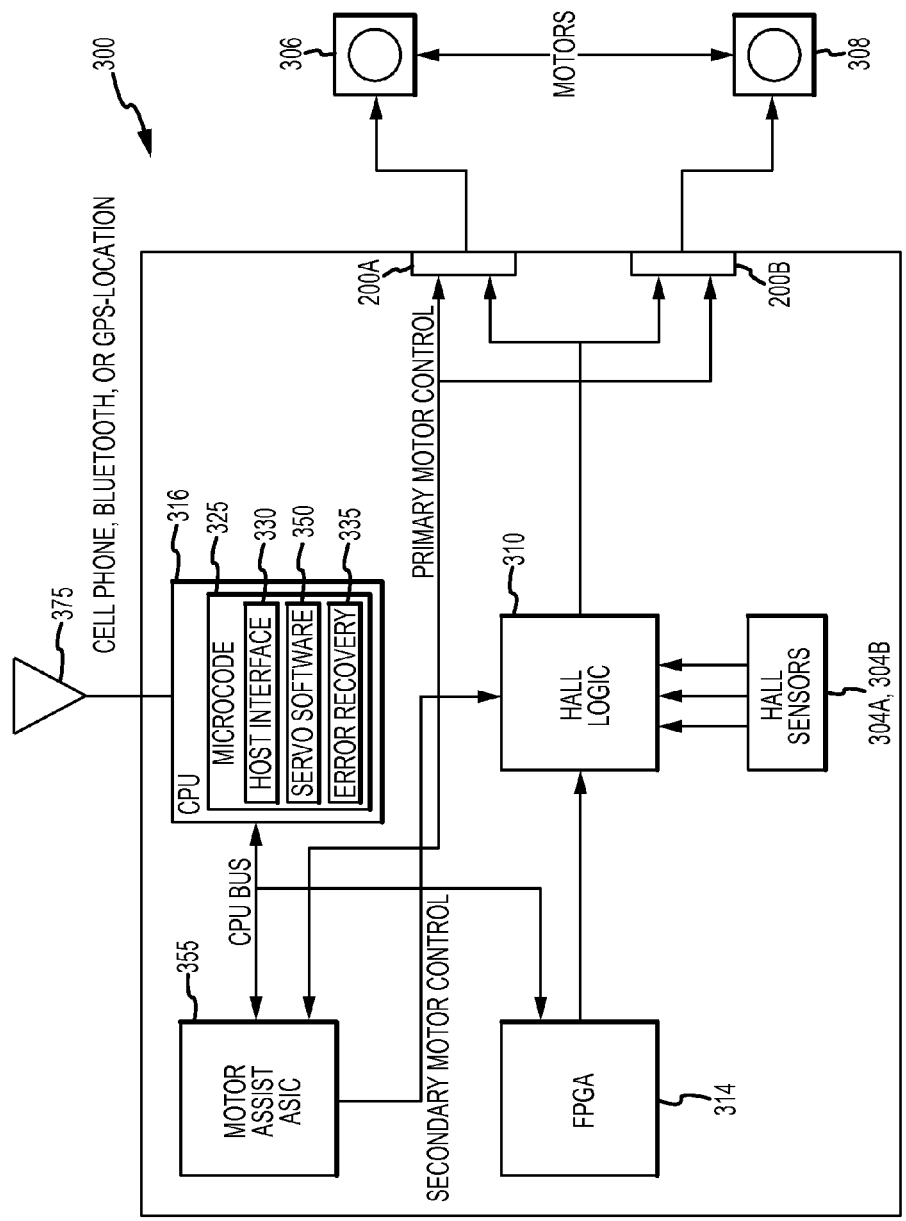
FIG. 3 is a portion of control circuit.

FIG. 3 is an exemplary block diagram of a portion of the tape system 300 in which the velocity switch system of the present invention may be incorporated. Motor driver circuits 200A and 200B are coupled to the two reel motors 306 and 308, respectively. Reel motors 306 and 308, drive first tape reel 104 and second tape reel 108 respectively (FIG. 1). Hall sensors 304A and 304B are coupled to the two reel motors 306 and 308, respectively.

The output from hall sensors 304A and 304B are coupled to hall sensor detection logic 310. During normal servo operation hall sensor detection logic 310 decodes the output signals from hall sensors 304A and 304B to provide motor rotation information for servo software 350. Hall sensor detection logic 310 may be implemented for example by software, firmware, hardware circuits (such as a field programmable gate array (FPGA) 314 as shown), a CPU, ASIC, etc., or a combination thereof. Servo software 350 processes the output from hall sensor detection logic 310 using control system laws to produce primary motor control signals that are transferred through motor assist ASIC (Application Specific Integrated Circuit) 355 and delivered to motor driver circuits 200A and 200B. Motor assist ASIC 355 provides current control logic.

A description of the operation of servo control system for the two reel motors 306 and 308 is given in application Ser. No. 10/223,967 entitled "Direction detection and count method for three channel commutation sensor", filed on Aug. 8, 2002, by the assignee of the present invention, of which is hereby incorporated by reference in its entirety.

Servo software 350 operates within the microcode section 325 of CPU 316. Other software components, including host interface 330 and error recovery 335 also operate within the microcode section 325 of CPU 316. Host interface 330 provides communication between external hosts and CPU 316. Error recovery 335 provides software procedures to enable CPU 316 to direct operations to recover from errors that may occur during operation of the tape drive. In addition, a wireless communication device 375, such as cell phone telepathy, Bluetooth or global positioning system (GPS)-location, may be used to input changes of N and m (as described below with particular reference to FIG. 25) into a servo system employing method 2500.

FIG. 4 shows a first embodiment of winding switches 410-412 with motor coils 420-425. The winding switches 410-412 switch segments of the windings in and out of use. The winding switches 410-412 may also be referred to as velocity control switches. Switches 410, 411, and 412 are shown in a position to enable serial connection of motor coils 420-425. During acceleration or deceleration, velocity switch output 235 activates and controls velocity switches 410, 411, and 412 in a position to enable serial connection of motor coils 420-425. This provides the maximum torque from reel motors 306 and 308.

During periods of higher velocity, velocity switch output 235 controls velocity switches 410, 411, and 412 in a position to enable parallel connection of motor coils 420-425. This provides the minimum BEMF to allow the maximum velocity from reel motors 306 and 308.

FIG. 5 shows a second embodiment of winding switches 510-512 with motor coils 520-525. The winding switches 510-512 switch segments of the windings in and out of use. The winding switches 510-512 may also be referred to as velocity control switches. Switches 510, 511, and 512 are shown in a position to enable serial connection of motor coils 520-525. During acceleration or deceleration, velocity switch output 235 controls velocity switches 510, 511, and 512 in a position to enable serial connection of motor coils 520-525. This provides the maximum torque from reel motors 306 and 308.

During periods of higher velocity, velocity switch output 235 controls velocity switches 510, 511, and 512 in a position to enable bypass of motor coils 520, 522, and 524 (coils 520, 522, and 524 are left open). This provides the minimum BEMF to allow the maximum velocity from reel motors 306 and 308.

Figure 6:
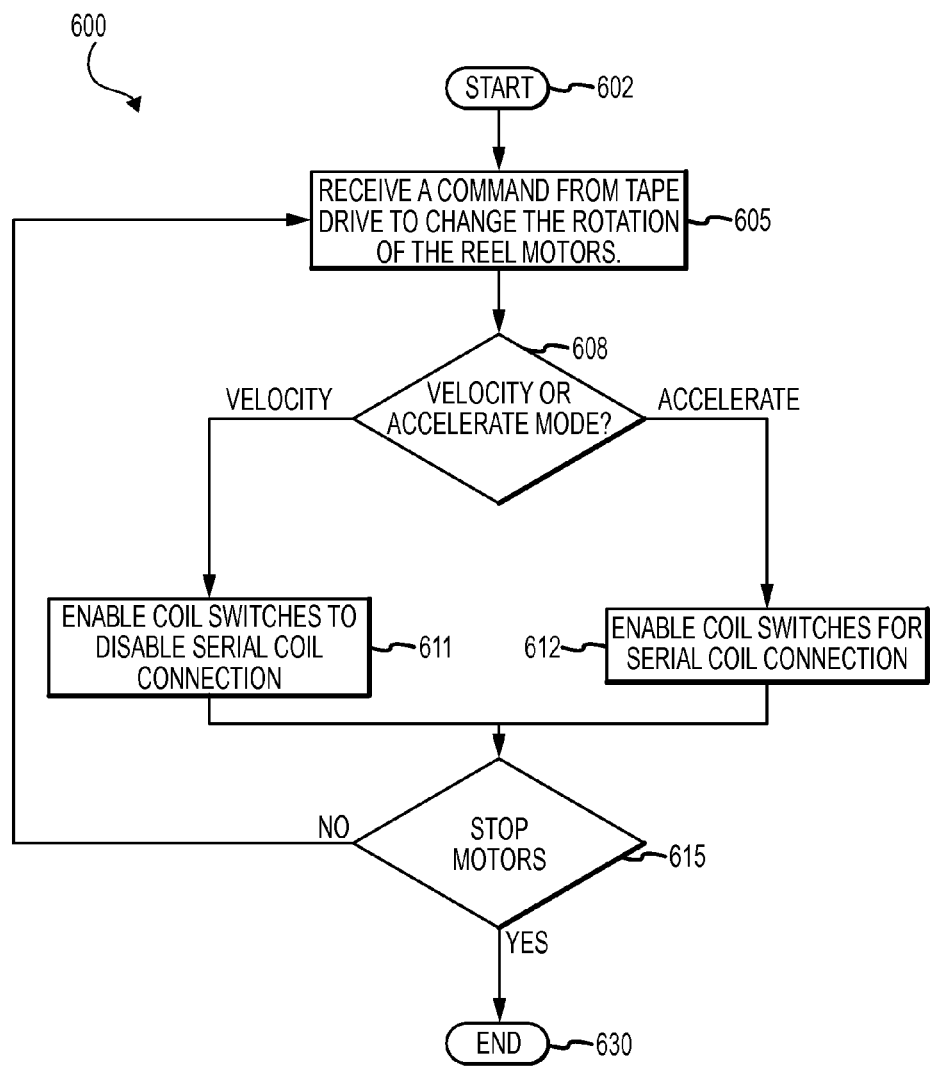
FIG. 6 is an exemplary flowchart for operation.

Turning to FIG. 6, an exemplary method of operation incorporating the mechanisms of the present invention is depicted. As one skilled in the art will appreciate, various steps in the method may be implemented in differing ways to suit a particular application. In addition, the described method may be implemented by various means, such as hardware, software, firmware, or a combination thereof. For example, the method may be implemented, partially or wholly, as a computer program product including a computer-readable storage medium having computer-readable program code portions stored therein. The computer-readable storage medium may include disk drives, flash memory, digital versatile disks (DVDs), Blu-Ray disks, compact disks (CDs), and other types of storage mediums.

FIG. 6 shows an exemplary flowchart 600 for operation. At step 605, control circuit 200 receives a command from a tape drive to change the rotation of reel motors 306 and 308. If at step 608, the tape drive requires an accelerate mode of operation, then step 612 is executed to enable velocity control switches 510-512 for serial coil connection. If at step 608, the tape drive requires an accelerate mode of operation, then step 611 is executed to disable velocity control switches 510-512 for serial coil connection.

Control flows from step 611 or 612 to step 615. At step 615, reel motors 306 and 308 are stopped, then control flows to step 630 to end, otherwise control flows to step 610, to receive another command from the tape drive.

In certain embodiments, more than two motor coils per phase may be used to provide multiple maximum velocities for a given motor and power supplies. For conceptual purposes, the mechanisms of the present invention may be thought to be analogous to a transmission in a car. For slower speeds and more torque (to provide greater acceleration) multiple motor coils are electronically switched in like low gears of a transmission, such as all coils 520-525 being electrically engaged as shown in FIG. 5. For higher velocities, fewer coils are used to reduce the BEMF, similar to the higher gears in a transmission, such as selectively bypassing coils 520, 522, and/or 524 as shown in FIG. 5.

The mechanisms of the present invention may be adapted for a variety of tape transport systems including a variety of tape media and tape drives, as one skilled in the art will anticipate. While one or more embodiments of the present invention have been illustrated in detail, the skilled artisan will appreciate that modifications and adaptations to those embodiments may be made without departing from the scope of the present invention as set forth in the following claims. For example, this same invention may be applied to hard disk drives and optical disk drives, as both of which use DC motors to spin a disk and both of which could benefit from faster spinning disks to reduce latency times for data I/O. Additionally, this invention may be applied to both optical tape as well as magnetic tape.

Moreover, the illustrated embodiments provide for optimal dynamic-reconfiguration-switching of coils within an electric motor, a brushless DC motor, tape drive system, wind turbine, electric motor within an electric car, and/or a variety of other types of motors having either a Y or Delta connection. More specifically, optimizing the dynamic reconfiguration-switching between individual motor windings occurs between multiple winding-configurations for increasing angular-velocity upon detecting the electric motor is at an optimal angular-velocity for an inductance switch, thereby preventing a total back electromotive force (BEMF) from inhibiting further increase in angular-velocity. The dynamic reconfiguration-switching of motor windings occurs between each of the winding-configurations at a minimal, optimal time for allowing a dynamic trade-off between the angular-velocity and angular-acceleration. In other words, the dynamic reconfiguration-switching of motor windings is optimized between winding-configurations for trading off angular-acceleration in favor of higher angular-velocity upon detecting an electric motor is at an optimal angular-velocity for switching to an optimal lower torque constant and voltage constant (the two being equal in SI units), thereby preventing a total back electromotive force (BEMF) from inhibiting further acceleration to a higher angular-velocity. It should be noted that the dynamic reconfiguration-switching of motor windings is optimized between winding-configurations for trading off angular-acceleration in favor of higher angular-velocity upon detecting a brushless DC motor, a tape drive system, a wind turbine, an electric motor within an electric car, and/or a variety of other types of motors is at an optimal angular-velocity for switching to an optimal lower torque constant and voltage constant (the two being equal in SI units), thereby preventing a total back electromotive force (BEMF) from inhibiting further acceleration to a higher angular-velocity.

As illustrated below, as used in the SI (System International, commonly known as "metric") units, the Voltage Constant (Kv) equals the Torque Constant (Kt). The symbol "K" is used to denote either the Voltage Constant (Kv) or Torque Constant (Kt) when all of the motor windings are in use, since Kv and Kt are both equal when measured in SI (System International or "metric" units). For example, the equation K=Kv=Kt illustrates K is equal to the voltage constant "Kv" and the also equal to the torque constant "Kt". "K" is used for simplicity. Also, as will be described below, a list of Parameters used are described as:

K=voltage constant Kv=torque constant Kt (Kv=Kt for SI units),

V=Maximum Angular-velocity of Motor under full voltage constant K, in radians per second, A=Angular-acceleration of Motor under full voltage constant K, in radians per second T=V/A=units of time in seconds, for V and A defined above m=number of equations=number of unknowns in the analysis,
j=index, 1≤j≤m,
$X_j$=X(j)=unknown, 1≤j≤m,
N=Multiplicative factor that V is multiplied by, N>1,
[A]=symmetric, tridiagonal coefficient matrix, size m-by-m,
{X}=vector of unknowns $X_j$, length of m,
{b}=right hand side vector={1 0 0 . . . 0 N}$^T$,
$F_j$=F(i)=factor used in the solution of [A] {X}={b},
$G_j$=G(i)=factor used in the solution of [A] {X}={b},
{KF}=vector of fractional voltage and torque constants={K, K/$X_j$, K/N}$^T$,
{Max_V}=vector of angular velocities for switching={V, $X_j$V, NV}$^T$,
WC=Number of possible winding-configurations in the motor=m+2, and
"m" denotes the number of simultaneous linear equations and number of unknowns. It should be noted that throughout the specification the term "winding-configuration" may also be referred to as state, switch-state, configuration-state, switch-configuration-state, and winding-configuration-state. In all tables of the description, the initial voltage and torque constant will always be the maximum K because all of the voltage and torque constant are to be used. Similarly, the final value of voltage and torque constant is always K divided N (e.g., K/N). Thus, there are m+2 winding-configurations in a motor analyzed by m simultaneous linear equation and m unknowns, and the other two winding-configurations (initial and final) are known; however, it is not known at what angular-velocity to optimally transition between the m+2 winding-configurations and vector {Max_V}, and the present invention solves that optimal-control challenge.

Turning now to FIG. 7, a table diagram 700 illustrating an exemplary derivation of the optimal switching calculation is depicted for optimizing a dynamic reconfiguration-switching between individual motor windings and dynamically switching between a 3-winding-configuration motor for trading off angular-acceleration in favor of increased angular-velocity between each successive winding-configuration, with N=3. The table gives the construction of a switching algorithm, assuming that the final angular-velocity is 3V, where V represents an undetermined number of radians per second of angular rotation and N=3 is used to give numerical answers to the calculations. The voltage constant and torque constant show that K, K/X, and K/3 represent the three winding-configurations progressing from winding-configuration-1 where all of the motor windings are in full use, to winding-configuration-2, and finally to winding-configuration-3 in successive order. In other words, the voltage constant and torque constant show a maximal value of K, and then decrease in value to K/X, and finally to K/3 for the three winding-configurations progressing from initial winding-configuration-1 where all motor windings are used, to winding-configuration-2, and finally to winding-configuration-3 in successive order. The angular-acceleration starts at a maximal value of A, then decreases in value to A/X, and finally to A/3 for the three winding-configurations progressing from winding-configuration-1, winding-configuration-2 and winding-configuration-3 in successive order. The delta angular-velocity is V, XV−V=(X−1)V, and 3V−XV=(3−X)V for the three winding-configurations progressing from winding-configuration-1, winding-configuration-2 and winding-configuration-3 in successive order. The maximal angular-velocity increases from V, XV and 3V for the three winding-configurations progressing from winding-configuration-1, winding-configuration-2 and winding-configuration-3 in successive order. The delta time is (V/A), X*(X−1)*(V/A), and 3*(3−X)*(V/A) for the three winding-configurations progressing from winding-configuration-1, winding-configuration-2, winding-configuration-3.

By adding up the right-most column (labeled as "Delta Time") in FIG. 7, the total time to accelerate via the switching algorithm is expressed by the following single, algebraic, and quadratic equation in unknown X:

$$\text{Total\_time} = \left(\frac{V}{A}\right) * [1 + X*(X-1) + 3(3-X)], \quad (5)$$

where X is unknown coefficient and is unitless, and the algebraic expression has the units of time from the quotient V/A, where V/A is a delta time, V is angular-velocity and A is angular-acceleration when all motor windings are engaged, 3V is the final angular-velocity in radians per second (used only as an example representing N=3) and X is the unknown value.

By differentiating the total time (equation 5) with respect to X, to find the optimal value of X, and setting that derivative to zero, the following linear algebraic equation in unknown X is attained:

$$d\left[\left(\frac{V}{A}\right) * \frac{[1 + X*(X-1) + 3(3-X)]}{dx}\right] = \left(\frac{V}{A}\right) * [2X - 1 - 3] = 0, \quad (6)$$

whereby solving for X yields the unknown value of X, and it is determined that X equals 2 (e.g., X=2). By taking a second derivative of the total time with respect to unknown X in equation 5, the second derivative is derived to be 2V/A, which is a positive constant:

$$\frac{2V}{A} > 0.. \quad (7)$$

This positive-second derivative indicates the optimal time for performing the dynamic reconfiguration-switching between individual motor windings in order to minimize the total time to ramp up to the angular velocity 3V. Because the second derivative is positive, it means that the algorithm has found the value of K/X equals (a) K/2 to switch to, (b) the time and angular-velocity to switch from K to K/2, and (c) the time and angular-velocity to switch from K/2 to K/3 in order to minimize the time to ramp up to the final angular-velocity 3V radians per second. In other words, the positive second derivative means the optimal time to perform the dynamic switching is determined, which is indeed the optimal solution for a 3-winding-configuration motor (the winding-configurations are defined in FIG. 8 below) going from 0 radians per second to 3V radians per second in the minimal, hence optimal, amount of time. In terms of introductory algebra, to help visualize this particular solution process, the total_time in equation (5) for a three winding-configuration motor is a simple parabola (a conic section) which is concave, meaning that it would "hold water" like a soup bowl. Taking the first derivative of the parabola with respect to X and setting that first derivative equal to zero, plus the fact that the second derivative of the parabola with respect to X is positive, results in the value of X=2 where the total_time in equation (5) is minimized and thus the performance of the three winding-configuration motor is optimized.

At this point, it is essential to introduce a generic value of "m" to denote the number of simultaneous, linear equations and to denote the number of unknowns, as will be used throughout the description. Also, it should be noted that "m=1" equations and "m=1" unknowns were used to derive the table in FIG. 8, as seen below, because the initial voltage and torque constant will always be the maximum K (voltage and torque constant) so that no voltage and/or torque constant go unused. Similarly, the final value of the voltage and torque constant is always K divided by the multiplicity "N" of angular-velocity V, hence K/3 (where N=3). The calculations are only determining X to define K/X which resulted in m=1 equation and m=1 unknown. Thus, there are m+2 winding-configurations in a motor analyzed by m simultaneous linear equation and m unknowns.

FIG. 8 is a table diagram 800 illustrating an exemplary profile of the optimal switching calculation for optimizing a dynamic reconfiguration-switching between individual motor windings in a 3-winding-configuration motor for trading off angular-acceleration in favor of increased angular-velocity between each successive winding-configuration. The voltage constant and torque constant show a maximal value of K, and then decrease in value to K/2, and finally to K/3 for the three winding-configurations progressing from initial winding-configuration-1 where all motor windings are used, winding-configuration-2 and winding-configuration-3 in successive order. The angular-acceleration shows a maximal value of A, and then decreases in value to A/2, and finally to A/3 for the three winding-configurations progressing from winding-configuration-1, winding-configuration-2 and winding-configuration-3 in successive order. The delta angular-velocity is V for each the three winding-configurations progressing from winding-configuration-1, winding-configuration-2 and winding-configuration-3 in successive order. The total angular-velocity increases from V, to XV=2V, to 3V for the three winding-configurations progressing from winding-configuration-1, winding-configuration-2 and winding-configuration-3 in successive order. The total angular velocity is the sum of the delta angular velocities, hence the total angular velocity for winding-configuration-2 is 2V=V+V, and the total angular velocity for winding-configuration-3 is 3V≤V+V+V. The delta time is (V/A)=T, 2(V/A)=2T, and 3(V/A)=3T giving a total "optimal" time (summation of the delta times) of 6T seconds to ramp up (e.g., accelerate) to an angular-velocity of 3V radians per second.

Figure 10:
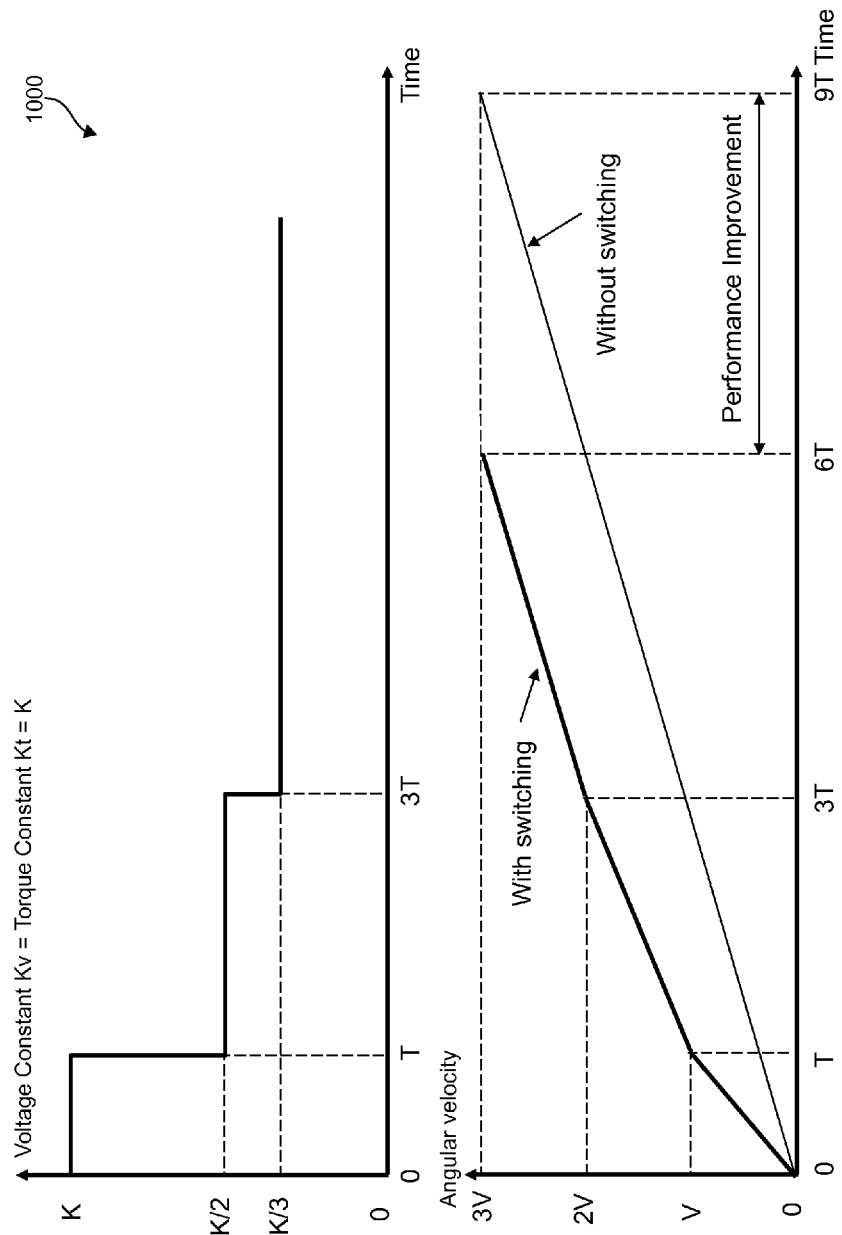
FIG. 10 is a graph diagram illustrating an exemplary operation for optimizing the dynamic reconfiguration-switching using a voltage constant as a function of the winding-configuration number "WC" using 3 winding-configurations.

FIG. 9 is a table diagram 900 illustrating an exemplary operation for optimizing the dynamic reconfiguration-switching using a voltage constant as a function of the winding-configuration number "WC" using 3 winding-configurations. Corresponding to FIG. 9, FIG. 10 is a graph diagram 1000 of FIG. 9, illustrating an exemplary operation for optimizing the dynamic reconfiguration-switching using a voltage constant as a function of the winding-configuration number "WC" using 3 winding-configurations. The voltage constant and torque constant show a maximal value of K, and then decrease in value to K/2, and finally to K/3 for the three winding-configurations progressing from winding-configuration-1 where all motor windings are used, winding-configuration-2 and winding-configuration-3 in successive order. The angular-acceleration shows a maximal value of A, and then decreases in value to A/2, and finally to A/3 for the three winding-configurations progressing from winding-configuration-1, winding-configuration-2 and winding-configuration-3 in successive order. The time when winding-configuration "WC" is in effect shows 0 to T, T to 3T, and 3T to 6T for the three winding-configurations progressing from winding-configuration-1, winding-configuration-2 and winding-configuration-3 in successive order. In other words, winding-configuration-1 is in effect from 0 to T and the motor windings are fully engaged for a maximal torque and voltage constant of K, and the motor is spinning up to an angular-velocity of V radians per second. When this angular-velocity V is reached, at time T, the motor windings are dynamically switched from winding-configuration-1 to winding-configuration-2 and the motor then operates at a lower voltage (and torque) constant K/2 and lower angular-acceleration A/2 to further increase its angular-velocity until it reaches a new angular-velocity 2V at time 3T. At time 3T, the dynamic switching is made from winding-configuration-2 to winding-configuration-3 and the motor then operates at still lower voltage (and torque constant) K/3 to further increase its angular-velocity until reaching a new angular-velocity 3V is reached at time 6T. The optimal, dynamic switching occurs when the velocity sensor of the electric motor detects that the electric motor is at the appropriate angular-velocity for such a switch in Kt and Kv. Without such a switch to reduce the voltage constant of the motor, the back-EMF of the motor would prohibit further increase of velocity beyond angular velocity V. Hence, the voltage constant of the motor is reduced to allow increased angular-velocity. Because the voltage constant and torque constant are equal (in SI units), changes to the motor torque-constant, which is equal to its voltage-constant, have an inverse relationship with the maximal angular-velocity of the motor, namely reducing the voltage constant increases the maximum attainable angular velocity (inversely proportional). However, if more angular acceleration is desired, additional windings are added, as there is a 1:1 relationship between the motor torque constant and angular-acceleration (directly proportional). Thus, the optimal switching algorithm allows the dynamic trade-off between higher angular-velocity and higher angular-acceleration.

FIG. 9 and FIG. 10 are neither geometric, powers of two, nor Fibonacci progressions. The optimal switching algorithm could be applied to tape drives, to make use of lower voltage power supplies, while still achieving high speed rewind. The optimal switching algorithm could be used in hard drive (HDD) motors, to achieve higher disk angular velocity while reducing motor heating. These same results could be used in electric cars, where the switching algorithm is effectively a 3-speed transmission, by way of example only, and thus eliminating the need for a separate transmission. With the switching algorithm described above it takes 6V/A (6T) seconds to accelerate to an angular-velocity of 3V radians per second, as seen in FIG. 9 and FIG. 10. Without the dynamical switching, it would take 9V/A (9T) seconds to accelerate to the same angular-velocity because a motor with a 3 times lower voltage constant would have to be employed to reach an angular-velocity of 3V radians per second. Thus, the mechanisms described herein, gain a significant advantage by employing dynamic-reconfiguration coil-switching within a electric motor, by using higher angular-acceleration at lower angular-velocity, and dynamically reducing the voltage-constant to keep accelerating, albeit at a lower angular-acceleration, to yield higher angular-velocity.

Having produced a methodology of m simultaneous equations and m unknowns, as described above, FIG. 11, below, analyzes a five-winding-configuration motor, one where five different voltage constants are used, which is a more complicated motor from the three-winding-configurations motor analyzed above. Turning now to FIG. 11, a table diagram 1100 illustrating exemplary derivation of the optimizing a dynamic reconfiguration-switching operations between individual motor windings and dynamically switching between a 5-winding-configuration motor for trading off angular-acceleration in favor of increased angular-velocity between each successive winding-configuration, with N=3, is depicted. FIG. 11 is a derivation of m+2=5, where m=3, winding-configuration switching algorithm, and N=3 is used to give numerical answers to the calculations. The Fig.'s described herein give the construction of a switching algorithm, assuming that the final angular-velocity is 3V radians per second (N=3). The voltage constant and torque constant show a maximal value of K, followed by K/X, K/Y, K/Z, and finally to K/3 for the five winding-configurations progressing from winding-configuration-1, winding-configuration-2, winding-configuration-3, winding-configuration-4, and winding-configuration-5 in successive order. The angular-acceleration shows a maximal value of A, followed by A/X, A/Y, A/Z, and then decreases in value to A/3 for the five winding-configurations progressing from winding-configuration-1, winding-configuration-2, winding-configuration-3, winding-configuration-4, and winding-configuration-5 in successive order. The delta angular-velocity is V, XV−V=(X−1)V, YV−XV=(Y−X)V, ZV−YV=(Z−Y)V, and 3V−ZV=(3−Z)V for the five winding-configurations progressing from winding-configuration-1, winding-configuration-2, winding-configuration-3, winding-configuration-4, and winding-configuration-5 in successive order. The maximal angular-velocity increases from V, XV, YV, ZV, and finally to 3V for the five winding-configurations progressing from winding-configuration-1, winding-configuration-2, winding-configuration-3, winding-configuration-4, and winding-configuration-5 in successive order. The delta time is (V/A), X*(X−1)*(V/A), Y*(Y−X)*(V/A), Z*(Z−Y)*(V/A), and 3*(3−Z)*(V/A) for the five winding-configurations progressing from winding-configuration-1, winding-configuration-2, winding-configuration-3, winding-configuration-4, and winding-configuration-5 in successive order. By adding up the right-most column (labeled as "Delta Time"), the total time to accelerate via the switching algorithm is expressed by the following single, algebraic, quadratic equation in unknowns X, Y, and Z:

$$\text{Total\_Time} = \left(\frac{V}{A}\right) * [1 + X*(X-1) + Y(Y-X)] + Z*(Z-Y) + 3(3-Z)], \quad (8)$$

where X, Y, and Z are unknown coefficients of the total time (equation 8) and are unitless, and the algebraic expression has the units of time from the quotient V/A, where V is the maximal angular-velocity and A is the angular-acceleration when all motor windings are engaged, and 3V is the final angular-velocity (N=3 used only as an example so that we get numerical answers). The unknown coefficients X, Y, and Z are unit-less and this algebraic expression has the units of time from the quotient V/A. (It should be noted that the variables X, Y, and Z may also be illustrated with other variable such as $X_1$, $X_2$, and $X_3$ as used and applied throughout the specification.) By successively differentiating the total time with respect to X, Y, and then Z, to find their optimal values by setting the respective derivatives to zero, these m=3 simultaneous linear equations (e.g., 3 simultaneous linear equations) are obtained and m=3 unknowns (e.g., 3 unknowns) are also obtained. In other words, by differentiating the total time with respect to X, Y, and Z to find optimal values of X, Y, and Z and setting each derivative for X, Y, and Z equal to zero, these m=3 simultaneous linear equations are attained:

$$d\left[\left(\frac{V}{A}\right) * \frac{[1 + X*(X-1) + Y(Y-X) + Z*(Z-Y) + 3(3-Z)]}{dx}\right] = \left(\frac{V}{A}\right) * [2X - 1 - Y] = 0, \quad (9)$$

$$d\left[\left(\frac{V}{A}\right) * \frac{[1 + X*(X-1) + Y(Y-X) + Z*(Z-Y) + 3(3-Z)]}{dx}\right] = \left(\frac{V}{A}\right) * [2Y - X - Z] = 0, \quad (10)$$

$$d\left[\left(\frac{V}{A}\right) * \frac{[1 + X*(X-1) + Y(Y-X) + Z*(Z-Y) + 3(3-Z)]}{dx}\right] = \left(\frac{V}{A}\right) * [2Z - Y - 3] = 0, \quad (11)$$

whereby solving for X, Y, and Z yields an optimal value for each of X, Y, and Z. The m=3 simultaneous linear equations and m=3 unknowns to solve are shown below, and it should be noted that these simultaneous equations take on the form of a tridiagonal matrix, which is derived in a "general" form in FIG. 21. For simplicity, using the variables $X_1$, $X_2$, and $X_3$ respectively in place of the variables X, Y, and Z and also substituting equation 8 (total time) into the formula, these same equations (9), (10), and (11), may appear as:

$$d[(V/A)*[\text{total time}]/dX_1 = (V/A)*[2X_1 - 1 - X_2] = 0, \quad (9B)$$

$$d[(V/A)*[\text{total time}]/dX_2 = (V/A)*[2X_2 - X_1 - X_3] = 0, \quad (10B)$$

$$d[(V/A)*[\text{total time}]/dX_3 = (V/A)*[2X_3 - X_2 - 3] = 0, \quad (11B)$$

The reason for the tridiagonal matrix is because each "interior" winding-configuration "j" in the electric motor is only affected by its neighboring winding-configuration "j−1" and "j+1," hence the coefficient matrix [A] has zero values everywhere except in the main diagonal, which is all 2's (e.g, the number "2"), and diagonals immediately adjacent to the main diagonal, which are both all −1's (e.g., the negative number "1"). In other words, the solution to the problem that is being solved uses matrix algebra with a characteristic form, namely a tridiagonal matrix. The coefficient matrix [A] is symmetric as well as tridiagonal. There are problems (but not in the present invention) that use "penta-diagonal" matrices and non-symmetric matrices, so being able to define the coefficient matrix of the present invention, as both tridiagonal and symmetric, are important mathematical properties of the present invention. Thus, the m=3 simultaneous linear equations and m=3 unknowns to solve results in these three simultaneous equations:

$$2X - Y = 1, \quad (12)$$

$$-X + 2Y - Z = 0, \quad (13)$$

$$-Y + 2Z = 3, \quad (14)$$

and these equations yield the solution vector as X=3/2, Y=2, and Z=5/2. This solution vector is then used in FIG. 12, below.

FIG. 12 is a table diagram 1200 illustrating an exemplary profile of the optimal switching calculation for optimizing dynamic winding reconfiguration-switching between individual motor windings in a 5-winding-configuration motor (e.g., WC=m+2=5 where m=3 as indicated above) for trading off acceleration in favor of increased angular-velocity between each successive winding-configuration. The voltage constant and torque constants dynamically decrease from their maximum value of K when all motor windings are engaged, to 2K/3, to K/2, to 2K/5, and finally to K/3 for the five winding-configurations progressing dynamically from winding-configuration-1, to winding-configuration-2, to winding-configuration-3, to winding-configuration-4, and finally to winding-configuration-5 in successive order. The angular-acceleration dynamically decreases from its maximum value of A, to 2A/3, to A/2, to 2A/5, and finally to A/3 for the five winding-configurations progressing dynamically from winding-configuration-1, to winding-configuration-2, to winding-configuration-3, to winding-configuration-4, and finally to winding-configuration-5 in successive order. The delta angular-velocity is V, V/2, V/2, V/2, and V/2 for the five winding-configurations progressing dynamically from winding-configuration-1, to winding-configuration-2, to winding-configuration-3, to winding-configuration-4, and finally to winding-configuration-5 in successive order. The total angular-velocity dynamically increases from V, to 3V/2, to 2V, to 5V/2, and finally to 3V for the five winding-configurations progressing dynamically from winding-configuration-1, to winding-configuration-2, to winding-configuration-3, to winding-configuration-4, and finally to winding-configuration-5 in successive order, and it is this increase in angular-velocity which is the desired result of the present invention. The total angular velocity is the sum of the respective delta angular velocities, hence the total angular velocity for winding-configuration-2 is 3V/2=V+V/2, the total angular velocity for winding-configuration-3 is 2V=V+V/2+V/2, the total angular velocity for winding-configuration-4 is 5V/2=V+V/2+V/2+V/2, and the total angular velocity for winding-configuration-5 is 3V=V+V/2+V/2+V/2+V/2.

Taking the second derivatives, of the total time in equation (8) with respect to X, Y, and Z (or using the variable $X_j$, where j is equal to 1, 2, 3 "j=1, 2, 3" as used and applied in the specification), all second-derivatives are equal to 2V/A which is positive, indicating that the present invention has solved for the optimal fractional voltage and torque constants, optimal angular velocities, and optimal times to switch to these optimal fractional voltage and torque constants.

$$d^2[(V/A)*[1+X*(X-1)+Y*(Y-X)+Z*(Z-Y)+3(3-Z)]/dX^2 = 2(V/A) > 0 \quad (15),$$

$$d^2[(V/A)*[1+X*(X-1)+Y*(Y-X)+Z*(Z-Y)+3(3-Z)]/dY^2 = 2(V/A) > 0 \quad (16),$$

$$d^2[(V/A)*[1+X*(X-1)+Y*(Y-X)+Z*(Z-Y)+3(3-Z)]/dZ^2 = 2(V/A) > 0 \quad (17),$$

or the following equation may be generically used where the variable $X_j$ replaces the variables X, Y, and Z:

$$d^2[(V/A)*[\text{total\_time}]/dX_j^2 = 2(V/A) > 0 \quad (18),$$

The unknown coefficients X, Y, and Z (and/or $X_j$) are unitless, and the algebraic expression for total time in equation (8) has the units of time from the quotient V/A. By taking second derivatives of the total time with respect to X, Y, and Z, (and/or $X_j$) a positive-second derivative is achieved in each case, which indicates a minimal time and thus optimal time for performing the dynamic reconfiguration-switching to achieve an angular velocity of 3V. The delta time is T, where T=(V/A), 3T/4, T, 5T/4, and 3T/2 giving a total time of 11T/2 seconds to ramp up (e.g., accelerate) to an angular-velocity of 3V radians per second, where T is the total time, for the five winding-configurations progressing from winding-configuration-1, winding-configuration-2, winding-configuration-3, winding-configuration-4, and winding-configuration-5 in successive order. Thus, with a five-winding-configuration motor (e.g., m+2=5 "five" different voltage constants), the optimal total time to ramp up (e.g., accelerate) is 11T/2 (5.5T) seconds, which is slightly faster than the 6T seconds obtained by the optimal three-winding-configuration motor, and definitely faster than 9T seconds obtained for a motor with no switching (a one-winding-configuration motor). FIG. 12 provides the optimal solution for a five-winding-configuration motor, which is T/2 seconds faster improvement in ramp-up time versus the optimal solution for the three-winding-configuration motor.

FIG. 13 is a table diagram 1300 illustrating an exemplary operation for optimizing the dynamic reconfiguration-switching using a voltage constant as a function of the winding-configuration number "WC" using 5 winding-configurations (e.g., 5 states). The voltage constant and torque constant shows a maximal value of K, and then decrease in value to 2K/3, K/2, 2K/5, and finally to K/3 for the five winding-configurations progressing from winding-configuration-1 where all motor windings are used, winding-configuration-2, winding-configuration-3, winding-configuration-4, and finally winding-configuration-5 in successive order. The angular-acceleration shows a maximal value of A, and then decrease in value to 2A/3, A/2, 2A/5, and finally to A/3 for the five winding-configurations progressing from winding-configuration-1, winding-configuration-2, winding-configuration-3, winding-configuration-4, and winding-configuration-5 in successive order. The delta angular-velocity is V, V/2, V/2, V/2, and V/2 for the five winding-configurations progressing dynamically from winding-configuration-1, to winding-configuration-2, to winding-configuration-3, to winding-configuration-4, and finally to winding-configuration-5 in successive order. The angular-velocity successively increases from V, 3V/2, 2V, 5V/2, and finally to 3V for the five winding-configurations progressing from winding-configuration-1, winding-configuration-2, winding-configuration-3, winding-configuration-4, and winding-configuration-5 in successive order. The total angular velocity is the sum of the respective delta angular velocities, hence the total angular velocity for winding-configuration-2 is 3V/2=V+V/2, the total angular velocity for winding-configuration-3 is 2V=V+V/2+V/2, the total angular velocity for winding-configuration-4 is 5V/2=V+V/2+V/2+V/2, and the total angular velocity for winding-configuration-5 is 3V=V+V/2+V/2+V/2+V/2. The time when winding-configuration "WC" is in effect showing 0 to T, T to 7T/4, 7T/4 to 11T/4, 11T/4 to 4T, and 4T to 11T/2 for the five winding-configurations progressing from winding-configuration-1, winding-configuration-2, winding-configuration-3, winding-configuration-4, and winding-configuration-5 in successive order. In other words, winding-configuration-1 (e.g., switching-state) is from 0 to T and the motor windings are fully engaged for a voltage and torque constant of K, spinning up to angular-velocity V radians per second. When this angular-velocity V is reached, then at time T, the motor windings are dynamically switched from winding-configuration-1 to winding-configuration-2 and the motor then operates at a lower voltage (and torque) constant 2K/3 and lower angular-acceleration 2A/3 to further increase its angular-velocity until it reaches angular-velocity 3V/2 at time 7T/4. When this angular-velocity 3V/2 is reached, at time 7T/4, the motor windings are dynamically switched from winding-configuration-2 to winding-configuration-3 and the motor then operates still at a lower voltage torque constant K/2, and subsequently still at a lower angular-acceleration, A/2, to further increase its angular-velocity time until it reaches angular-velocity 2V at 11T/4. When this angular-velocity 2V is reached, at time 11T/4, the motor windings are dynamically switched from winding-configuration-3 to winding-configuration-4 and the electric motor then operates still at a lower voltage and torque constant, 2K/5, and subsequently still at a lower angular-acceleration, 2A/5, to further increase its angular-velocity time until it reaches angular-velocity 5V/2 at 4T. When this angular-velocity 5V/2 is reached, at time 4T, the motor windings are dynamically switched from winding-configuration-4 to winding-configuration-5 and the electric motor then operates still at a lower voltage and torque constant, K/3, and subsequently still at a lower angular-acceleration, A/3, to further increase its angular-velocity time until it reaches angular-velocity 3V at 11T/2. The optimal, dynamic switching of individual motor windings occurs when the velocity sensor of the motor detects that the motor is at the appropriate angular-velocity for such a switch in Kt and Kv. Without such a switch to reduce the voltage constant of the motor, the back-EMF of the motor would prohibit further increase of velocity. Hence, the voltage constant of the motor is reduced to allow increased angular-velocity. Because the voltage constant and torque constant are equal (in SI units), changes to the motor torque-constant, which is equal to its voltage-constant, have an inverse relationship with the maximal angular-velocity of the motor, namely reducing the voltage constant increases the maximum attainable angular velocity (inversely proportional). However, if more angular acceleration is desired, additional windings are added, as there is a 1:1 relationship between the motor torque constant and angular-acceleration (directly proportional). Thus, the optimal switching algorithm allows the dynamic trade-off between higher angular-velocity and higher angular-acceleration.

As the speed of the electric motor is ramped up (e.g., accelerated), the motor torque constant, which is equal to the voltage constant in SI units and thus is equal to the angular-acceleration, monotonically decreases, as the angular-acceleration is traded-off for a higher maximum angular-velocity in that particular state. Thus, the m simultaneous-equations, with m unknowns (e.g., multiple unknowns represented by the variable "m") as described in FIGS. 7-13, are used to solve for the optimal switching voltage constants and determine at what optimal angular-velocity to perform the dynamic switching of the individual motor windings and transition between the multiple winding-configurations, going from one winding-configuration to the next in a sequential order. The number of equations to solve increases, starting from one equation for a three-winding-configuration motor, and adding an additional simultaneous equation for each additional winding-configuration (each additional change in voltage constant) added beyond that to whichever winding-configuration that is desired. Thus, as illustrated in FIGS. 11 and 12, there are three linear equations with three unknowns for the five-winding-configuration electric motor. More generically for example, for performing the dynamic reconfiguration-switching of motor windings in WC=5 winding-configurations and higher numbers of winding-configuration "WC", a tri-diagonal set of equations would be used. Also, the only progression followed by the voltage constants and torque constants in FIG. 12, is one of a monotonically decreasing progression.

As will be illustrated below, further analysis is provided for two-winding-configurations (2 different voltage constants) and four-winding-configurations (4 different voltage constants) showing improved performance. An optimal two-winding-configuration motor (e.g. m+2=2 where m=0) is analyzed in FIG. 14, giving a total time to reach an angular-velocity of 3V radians per second as 7T seconds, which is an improvement over the 9T seconds required by a single voltage constant (no change in voltage constant) motor. There are no equations and no unknowns here in the two-state, as there are too few winding-configurations (e.g., m=0 so there are no equations and no unknowns to be solved). The initial voltage and torque constant is K and the final voltage and torque constant is K/3.

FIG. 14 is a table diagram 1400 illustrating an exemplary operation for optimizing the dynamic reconfiguration-switching using a voltage constant as a function of the winding-configuration number "WC" using 2 winding-configurations, with N=3. The voltage constant and torque constant show a maximal value of K, and then decrease in value to K/3 for the two winding-configurations progressing from winding-configuration-1 to winding-configuration-2 in successive order. The angular-acceleration shows a maximal value of A, and then decreases in value to A/3 for the two winding-configurations progressing from winding-configuration-1 to winding-configuration-2 in successive order. The total angular-velocity increases from V to 3V for the two winding-configurations progressing from winding-configuration-1 to winding-configuration-2 in successive order. The time when winding-configuration "WC" is in effect shows the dynamic switching of the motor windings occurring between winding-configuration-1, which is 0 to T, and winding-configuration-2, which is T to 7T, for the two winding-configurations progressing from winding-configuration-1 to winding-configuration-2 in successive order. In other words, winding-configuration-1 is from 0 to T and the motor windings are fully engaged, spinning up to angular-velocity V radians per second. When this angular-velocity V is reached, then at time T, the motor windings are dynamically switched from winding-configuration-1 to winding-configuration-2 and the electric motor then operates at a lower voltage (and torque) constant K/3 and lower angular-acceleration A/3 to further increase its angular-velocity until it reaches angular-velocity 3V at time 7T. The optimal, dynamic switching occurs when the velocity sensor of the electric motor detects that the electric motor is at the appropriate angular-velocity for such a switch in Kt and Kv. Without such a switch to reduce the voltage constant of the motor, the back-EMF of the motor would prohibit further increase of velocity. Hence, the voltage constant of the motor is reduced to allow increased angular-velocity. Because the voltage constant and torque constant are equal in SI units, changes to the motor torque-constant (which is equal to its voltage-constant) are directly proportional with the angular-acceleration of the motor and inversely proportional to the total angular velocity. Thus, the optimal switching algorithm allows the dynamic trade-off between higher angular-velocity and higher angular-acceleration to reach the maximum angular velocity in the minimal amount of time.

Turning now to FIG. 15, a table diagram 1500 illustrating an exemplary derivation of the optimal switching calculation is depicted for optimizing a dynamic reconfiguration-switching between individual motor windings and dynamically switching between a 4-winding-configuration motor for trading off angular-acceleration in favor of increased angular-velocity between each successive winding-configuration, with N=3. FIG. 15 is a derivation of m+2=4 winding-configurations optical switching algorithm, where m=2. FIG. 15 analyzes a four-winding-configuration motor, where four different voltage constants are used, which is a more complicated motor from the three-winding-configuration motor analyzed above. The table gives the construction of a switching algorithm, assuming that the final angular-velocity is 3V radians per second. The voltage constant and torque constant show a maximal value of K, and then decrease in value to K/X, K/Y, and finally to K/3 for the four winding-configurations progressing from winding-configuration-1, winding-configuration-2, winding-configuration-3, and winding-configuration-4 in successive order. The angular-acceleration shows a maximal value of A, and then decreases in value to A/X, A/Y, and finally to A/3 for the four winding-configurations progressing from winding-configuration-1, winding-configuration-2, winding-configuration-3, and winding-configuration-4 in successive order. The delta angular-velocity is V, XV−V=(X−1)V, YV−XV=(Y−X)V, 3V−YV=(3−Y)V for the four winding-configurations progressing from winding-configuration-1, winding-configuration-2, winding-configuration-3, and winding-configuration-4 in successive order. The maximal angular-velocity increases from V, XV, YV, and finally to 3V for the four winding-configurations progressing from winding-configuration-1, winding-configuration-2, winding-configuration-3, and winding-configuration-4 in successive order. The delta time is (V/A), X*(X−1)*(V/A), Y*(Y−X)*(V/A), and 3*(3−Z)*(V/A) for the four winding-configurations progressing from winding-configuration-1, winding-configuration-2, winding-configuration-3, and winding-configuration-4 in successive order. (It should be noted that the variables X and Y may also be illustrated with other variable such as $X_1$, and $X_2 \cdot X_1$ and $X_2$)

By adding up the right-most column (labeled as "Delta Time"), the total time to accelerate via the switching algorithm is expressed by the following simple, algebraic, and quadratic equation in X and Y:

$$\text{Total Time} = \left(\frac{V}{A}\right) * [1 + X*(X-1) + Y(X-1)] + Y*(Y-X) + 3(3-Y)], \quad (19)$$

where X and Y are unknown coefficient of the total time and are unitless, and the algebraic expression for total time has the units of time from the quotient V/A, V is the maximal angular-velocity and A is the angular-acceleration when all motor windings are being used, 3V radians per second is the final angular-velocity (N=3 is used only as an example). By successively differentiating the total time with respect to X and Y to find optimal values of X and Y and setting the derivatives for X and Y equal to zero, these m=2 equations (e.g., 2 equations) and m=2 unknowns are attained:

$$d\left[\left(\frac{V}{A}\right)*\frac{[1+X*(X-1)+Y(Y-X)+3(3-Y)]}{dx}\right] = \left(\frac{V}{A}\right)*[2X-1-Y]=0, \quad (20)$$

$$d\left[\left(\frac{V}{A}\right)*\frac{[1+X*(X-1)+Y(Y-X)+3(3-Y)]}{dx}\right] = \left(\frac{V}{A}\right)*[2Y-X-3]=0, \quad (21)$$

whereby solving for X and Y yields an optimal value for X and Y. The unknown coefficients X and Y are unitless and these algebraic expressions have the units of time from the quotient V/A. By taking second derivatives of the total time with respect to X and Y, a positive-second derivative (2V/A) is achieved in each case, which indicates a minimal-optimal time for performing the dynamic reconfiguration-switching. For simplicity, using the variables $X_1$, and $X_2$, $X_1$ and $X_2$ respectively in place of the variables X and Y and also substituting equation 19 (total time) into the formula, these same equations (20) and (21), may appear as:

$$d[(V/A)*[\text{total\_time}]/dX_1=(V/A)*[2X_1-1-X_2]=0, \quad (20B)$$

$$d[(V/A)*[\text{total\_time}]/dX_2=(V/A)*[2X_2-X_1-3]=0, \quad (21B)$$

and the m=2 simultaneous equations to solve are only the top and bottom rows of the general tridiagonal matrix solved for in the table of FIG. 21, which results in the two simultaneous equations to solve as:

$$2X-Y=1, \quad (22)$$

$$-X+2Y=3, \quad (23)$$

and these equations yield a solution vector as X=5/3 and Y=7/3. This solution vector is then used in FIG. 16, below.

FIG. 16 is a table diagram 1600 illustrating an exemplary profile of optimizing a dynamic reconfiguration-switching between individual motor windings in a 4-winding-configuration (e.g., m+2=4, where m=3, as described above) motor for trading off acceleration in favor of increased angular-velocity between each successive winding-configuration. The voltage constant and torque constant show a maximal value of K, and then decrease in value to 3K/5, 3K/7, and finally to K/3 for the four winding-configurations progressing from winding-configuration-1 when all motor windings are used, winding-configuration-2, winding-configuration-3, and winding-configuration-4 in successive order. The angular-acceleration shows a maximal value of A, and then decreases in value to 3A/5, 3A7, and finally to A/3 for the four winding-configurations progressing from winding-configuration-1, winding-configuration-2, winding-configuration-3, and winding-configuration-4 in successive order. The delta angular-velocity is V, 2V/3, 2V/3, and 2V/3 for the four winding-configurations progressing from winding-configuration-1, winding-configuration-2, winding-configuration-3, and winding-configuration-4 in successive order. The total angular velocity increases from V, 5V/3, 7V/3, and finally to 3V for the four winding-configurations progressing from winding-configuration-1, winding-configuration-2, winding-configuration-3, and winding-configuration-4 in successive order. The total angular velocity is the sum of the respective delta angular velocities, hence the total angular velocity for winding-configuration-2 is 5V/3=V+2V/3, the total angular velocity for winding-configuration-3 is 7V/3=V+2V/3+2V/3, the total angular velocity for winding-configuration-4 is 3V=V+2V/3+2V/3+2V/3. The delta time is T, where T=(V/A), 10T/9, 14T/9, and 2T giving a total time of 51T/9 seconds to ramp up (e.g., accelerate) to an angular-velocity of 3V radians per second, where 51T/9 is the total time for the four winding-configurations progressing from winding-configuration-1, winding-configuration-2, winding-configuration-3, and winding-configuration-4 in successive order. Taking second derivatives of the total time for X and Y, both second-derivatives are positive (and equal to each other), indicating the solutions of X and Y provide the optimal fractional voltage and torque constants, optimal angular velocities, and optimal times to switch to these optimal fractional voltage and torque constants:

$$d^2[(V/A)*[1+X*(X-1)+Y*(Y-X)+3(3-Y)]/dX^2=2(V/A)$$
$$>0 \quad (24),$$

$$d^2[(V/A)*[1+X*(X-1)+Y*(Y-X)+3(3-Y)]/dY^2=2(V/A)$$
$$>0 \quad (25),$$

or the following equation may be used generically where the variable $X_j$ (where j=1 or 2) replaces the variables X and Y, as in equation (19) and (20):

$$d^2[(V/A)*[\text{total\_time}]/dX_j^2=2(V/A)>0 \quad (26),$$

thus, with a four-winding-configuration motor (four different voltage constants), the optimal total time to ramp up (e.g., accelerate) is 51T/9 (5.67T) seconds which is slower than 11T/2 (5.5T) seconds for a five-winding-configuration motor, but faster than the 6T seconds obtained by the optimal three-winding-configuration motor, and also faster than 9T seconds obtained for a motor with no switching (a one-winding-configuration motor). To visualize this particular solution process, the total_time in equation (19) for a four winding-configuration motor is a parabolic surface (like the reflective surface of a telescope mirror or an automobile headlight) which is concave, meaning that it would "hold water" like a soup bowl. Taking the first derivatives of the parabola with respect to X and Y and setting those first derivatives equal to zero, plus the fact that the second derivatives of the parabola with respect to X and Y are positive, results in the values of X=5/3 and Y=7/3 where the total_time in equation (19) is minimized and thus the performance of the four winding-configuration motor is optimized.

FIG. 17 is a table diagram 1700 illustrating an exemplary operation for optimizing the dynamic reconfiguration-switching using a voltage constant as a function of the winding-configuration number "WC" using 4 winding-configurations (e.g., 4 switching-states). As the speed of the electric motor is ramped up, the motor torque constant, which is equal to the voltage constant in SI units and thus is equal to the angular-acceleration, monotonically decreases, as the angular-acceleration is traded-off for a higher maximum angular-velocity in that particular state. The voltage constant and torque constant show a maximal value of K, and then decrease in value to 3K/5, 3K/7, and finally to K/3 for the four winding-configurations progressing from winding-configuration-1 where all motor windings are used, winding-configuration-2, winding-configuration-3, and winding-configuration-4 in successive order. The angular-acceleration shows a maximal value of A, and then decrease in value to 3A/5, 3A/7, and finally to A/3 for the four winding-configurations progressing from winding-configuration-1, winding-configuration-2, winding-configuration-3, and winding-configuration-4 in successive order. The delta angular-velocity is V, 2V/3, 2V/3, and 2V/3 for the four winding-configurations progressing from winding-configuration-1, winding-configuration-2, winding-configuration-3, and winding-configuration-4 in successive order. The total angular-velocity increases from V, 5V/3, 7V/3, finally to 3V for the four winding-configurations progressing from winding-configuration-1, winding-configuration-2, winding-configuration-3, and winding-configuration-4 in successive order. The total angular velocity is the sum of the respective delta angular velocities, hence the total angular velocity for winding-configuration-2 is 5V/3=V+2V/3, the total angular velocity for winding-configuration-3 is 7V/3=V+2V/3+2V/3, the total angular velocity for winding-configuration-4 is 3V/=V+2V/3+2V/3+2V/3. The time when winding-configuration "WC" is in effect shows the dynamic switching of the motor windings occurring between winding-configuration-1, which is 0 to T, and winding-configuration-2, which is T to 19T/9, and winding-configuration-2 and winding-configuration-3, which is 19T/9 to 33T/9, and winding-configuration-3 and winding-configuration-4, which is 33T/9 to 51T/9, for the four winding-configurations progressing from winding-configuration-1, winding-configuration-2, winding-configuration-3, and winding-configuration-4 in successive order. In other words, winding-configuration-1 (e.g., switching-state) is from 0 to T and the motor windings are fully engaged, resulting in a torque constant and voltage constant of K, spinning up to angular-velocity V radians per second. When this angular-velocity V is reached, then at time T, the motor windings are dynamically switched from winding-configuration-1 to winding-configuration-2 and the electric motor then operates at a lower voltage (and torque) constant 3K/5, and lower angular-acceleration 3A/5, to further increase its angular-velocity until it reaches angular-velocity 5V/3 at time 19T/9. When this angular-velocity 5V/3 is reached, at time 19T/9, the motor windings are dynamically switched from winding-configuration-2 to winding-configuration-3 and the electric motor then operates still at a lower voltage and torque constant 3K/7, and subsequently still at a lower angular-acceleration, 3A/7, to further increase its angular-velocity time until it reaches angular-velocity 7V/3 at 33T/9. When this angular-velocity 7V/3 is reached, at time 33T/9, the motor windings are dynamically switched from winding-configuration-3 to winding-configuration-4 and the electric motor then operates still at a lower voltage and torque constant, K/3, and subsequently still at a lower angular-acceleration, A/3, to further increase its angular-velocity time until it reaches angular-velocity 3V at 51T/9. The optimal, dynamic switching of individual motor windings occurs when the velocity sensor of the motor detects that the motor is at the appropriate angular-velocity for such a switch in Kt and Kv.

Figure 19:
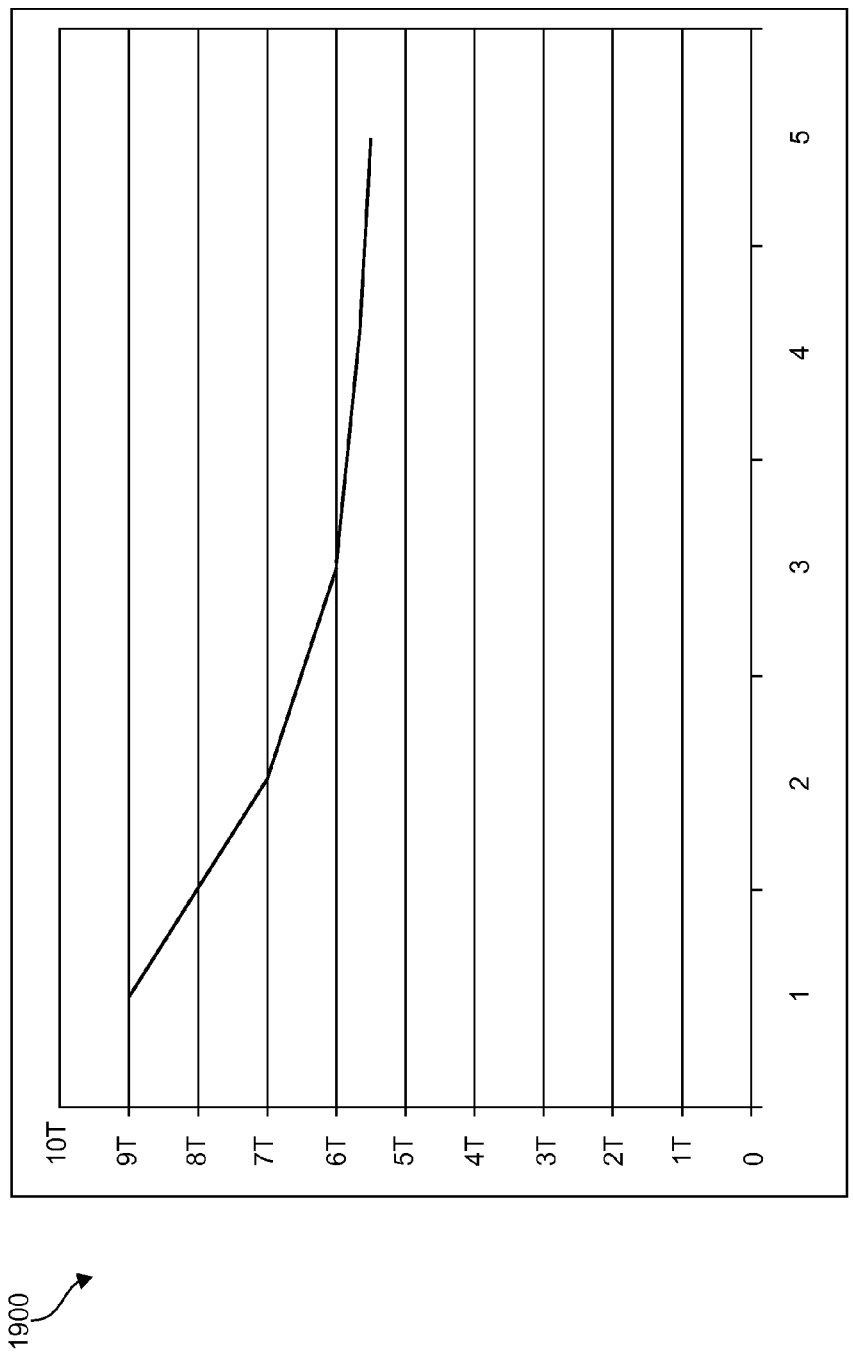
FIG. 19 is a graph diagram summarizing FIGS. 7-17 in terms of the total time to ramp up to an angular velocity of 3V versus the total number of available winding-configurations, where T=V/A.

FIG. 18 is a table diagram summarizing FIGS. 7-17 in terms of the total time to ramp up to an angular velocity of 3V versus the total number of available winding-configurations, where T=V/A. FIG. 19 is a graph diagram summarizing FIGS. 7-17 in terms of the total time to ramp up to an angular velocity of 3V versus the total number of available winding-configurations, where T=V/A. For a motor with only one winding-configuration, the total ramp up to 3V radians per second (the multiplication of V by N=3 is only used only as an example) is 9T seconds, as shown in FIG. 10. In decimal form this equates to 9T. For a motor with two winding-configurations (2 switching-states), the total ramp up time (acceleration phase) to 3V radians per second is 7T seconds, as shown in FIG. 14. In decimal form this equates to 7T. For a motor with three winding-configurations (e.g., 3 switching-states), the total ramp up to 3V radians per second is 6T seconds, as shown in FIG. 8. In decimal form this equates to 6T. For a motor with four winding-configurations (e.g., 4 switching-states), the total ramp up to 3V radians per second is 51T/9 seconds, as shown in FIG. 16. In decimal form this equates to 5.67T. For a motor with five winding-configurations (e.g., 5 switching-states), the total ramp up to 3V radians per second is 11T/2 seconds, as shown in FIG. 12. In decimal form this equates to 5.5T. Thus, the more winding configurations that are physically available for switching, the lower the total time to accelerate to the final angular velocity of 3V radians per second. However, the incremental change in total time to accelerate to the final angular velocity of 3V radians per second diminishes as more winding configurations are added.

As illustrated in column 1 (labeled as the total number of WC), the total number of available winding configurations are 1, 2, 3, 4, and 5. As stated above, the total time for a motor only having 1 winding configuration is 9T. But a motor with 2 winding configurations has a total time of 7T. Thus, as more available winding configurations are added to the motor, the faster it reaches its 3V angular velocity. The idea here is that as the motor has more winding configurations to choose from, the total time is reduced, and this is illustrated in both FIGS. 18 and 19. An analogy to a car having a manual transmission may be used for illustration purposes. For example, if a user desires to accelerate faster to 75 mph in the car, the car having a 4-speed transmission would reach the desired speed faster than a car having a 3-speed transmission. Similarly, the car having a 5-speed transmission would reach the desired speed faster than a car having a 4-speed transmission. This analogy is exactly what FIGS. 18 and 19 are illustrating with the motor having the various winding configurations.

Turning now to FIG. 20, a table diagram 2000 illustrating an exemplary derivation of a 3-winding-configuration optimal switching algorithm for optimizing a dynamic reconfiguration-switching between individual motor windings and dynamically switching between a 3-winding-configuration motor for trading off acceleration in favor of increased angular-velocity between each successive winding-configuration is depicted, now generalizing with N being a variable rather than the special case of N=3. FIG. 20 provides the construction of the switching algorithm, assuming that the final angular-velocity is "NV" radians per second (N being an arbitrary valued multiplier. N previously had been 3, as illustrated above, to allow calculations to have numerical answers.) and m+2=3 (e.g., three) winding-configurations are used to illustrate a generalization of the optimal switching algorithm for any high speed angular-velocity, rather than the 3V radians per second, as illustrated above. For example, the use of 3V (e.g., N=3) came from the IBM® 3480 tape drive which had a high speed rewind three times that of a normal read-write velocity.

By adding up the right-most column (labeled as "Delta Time"), the total time to accelerate via the switching algorithm is expressed by the following single, algebraic, and quadratic equation in unknown X:

$$\text{Total Time} = \left(\frac{V}{A}\right) * [1 + X*(X-1) + N(N-X)],\quad (27)$$

where X is unknown coefficient and is unitless, and the algebraic expression for total_time has the units of time from the quotient V/A, V is the maximal angular-velocity, and A is the angular-acceleration when all motor windings are being used, N is an arbitrary value greater than unity (e.g., N=3 as used above for illustration purposes for the previous calculations) representing a multiplier of the angular-velocity V to give the final angular-velocity as NV, and X is an unknown coefficient.

By differentiating the total time with respect to X, to find the optimal value of X, and setting that derivative to zero, the following linear equation is attained:

$$d\left[\left(\frac{V}{A}\right) * \frac{[1 + X*(X-1) + N(N-X)]}{dx}\right] = \left(\frac{V}{A}\right) * [2X - 1 - N] = 0,\quad (28)$$

whereby solving for X yields the unknown value of X, it is determined that X equals (N+1)/2. By taking a second derivative of the total time with respect to X, the second derivative is derived to be:

$$\frac{2V}{A} > 0,\quad (29)$$

whereby this positive-second derivative which is achieved, indicates that the solution for X provides an optimal time for performing the dynamic reconfiguration-switching of the motor windings to achieve the minimal time to achieve an angular-velocity of NV. Because the second derivative is positive, the minimum time (e.g., the minimal-optimal time) to perform the dynamic reconfiguration-switching of the motor windings is determined, which is indeed the optimal solution for a 3-winding-configuration motor going from 0 radians per second to NV radians per second. In other words, because the second derivative is positive, the second derivative with respect to X means (a) the value of the K/X equals 2K/(N+1) to switch to, (b) the time and angular-velocity to switch from K to 2K/(N+1), and (c) the time and angular-velocity to switch from 2K/(N+1) to K/N are optimal, in order to minimize the time to ramp up to the final angular-velocity NV is determined. These results are consistent with above calculations where N=3 was used. In terms of introductory algebra, to help visualize this particular solution process, the total_time in equation (27) for a three winding-configuration motor is a simple parabola (a conic section) which is concave, meaning that it would "hold water" like a soup bowl. Taking the first derivative of the parabola with respect to X and setting that first derivative equal to zero, plus the fact that the second derivative of the parabola with respect to X is positive, results in the value of X=(N+1)/2 where the total_time in equation (27) is minimized and thus the performance of the three winding-configuration motor is optimized. This value of X=(N+1)/2 is equivalent to the value of X=2 for the special case of N=3 for the total_time equation (5).

FIG. 21 is a table diagram 2100 illustrating an exemplary and fully generalized derivation of a (m+2)-winding-configuration optimal switching algorithm for a final velocity of NV, where V is the maximum angular-velocity for the full voltage and torque constant K. By adding up the right-most column in the table of FIG. 21, the total time to accelerate via our switching algorithm is expressed by this single algebraic expression for total time which is quadratic in each unknown $X_1, X_2, X_3, \ldots, X_m$:

$$\text{Total Time}=(V/A)*[1+X_1*(X_1-1)+X_2*(X_2-X_1)+X_3*(X_3-X_2)+\ldots+X_m*(X_m-X_{m-1})+N*(N-X_m)]\quad (30),$$

where {X} is the vector of unknown $X_1, X_2, X_3, \ldots, X_m$ that are unitless, and this single algebraic expression for total time has the units of time from the quotient V/A, and N is an arbitrary multiplier representing the final angular-velocity NV, and X is an unknown coefficient of the total time. By successively differentiating the total_time with respect to $X_1$, $X_2, X_3, \ldots X_m$, to find their optimal values by setting the respective derivatives to zero, these m simultaneous equations and m unknowns are attained:

$$d[(V/A)*[\text{Total\_Time}]/dX_1=(V/A)*[2X_1-1-X_2]=0\quad (31),$$

$$d[(V/A)*[\text{Total\_Time}]/dX_j=(V/A)*[2X_j-X_{j-1}-X_{j+1}]=0$$
$$\text{for } j=2\ldots m-1\quad (32),$$

$$d[(V/A)*[\text{Total\_Time}]/dX_m=(V/A)*[2X_m-X_{m-1}-N]=0\quad (33),$$

and taking second derivatives, of total time for $X_1, X_2, X_3, \ldots X_m$, all second-derivatives are positive (and equal to each other), indicating that the present invention has solved for the optimal fractional voltage and torque constants, optimal angular velocities, and optimal times to switch to these optimal fractional voltage and torque constants, by using the following equations for the taking the second derivative, which are positive (e.g., greater than zero):

$$d^2[(V/A)*[\text{Total\_Time}]/dX_1^2=2(V/A)>0\quad (34),$$

$$d^2[(V/A)*[\text{Total\_Time}]/dX_j^2=2(V/A)>0 \text{ for } j=2\ldots$$
$$m-1\quad (35),$$

$$d^2[(V/A)*[\text{Total\_Time}]/dX_m^2=2(V/A)>0\quad (36),$$

or the following equation may generically used where the variable $X_j$ is used and replaces the variables $X_1, X_j, X_m$, as used in equations (34), (35), and (36):

$$d^2[(V/A)*[\text{Total\_Time}]/dX_j^2=2(V/A)>0 \text{ for } j=1\ldots m\quad (37).$$

The m simultaneous linear equations to solve for the m unknowns are (31), (32), and (33). These m simultaneous linear equations form a tridiagonal system of equations where all entries of the coefficient matrix are 2 along the main diagonal, and −1 along the diagonals immediately adjacent the main diagonal, and all other entries in the coefficient matrix are zero. As stated before, coefficient matrix [A] is symmetric as well as tridiagonal, meaning that coefficient matrix [A] has specific mathematical characteristics. The m simultaneous linear equations to solve for the m unknowns are:

$$2X_1 - X_2 = 1, \quad (38),$$

$$-X_{j-1} + 2X_j - X_{j+1} = 0 \text{ for } j=2 \ldots m-1, \quad (39),$$

$$-X_{m-1} + 2X_m = N, \quad (40),$$

where these simultaneous linear equations to be solved are placed in the tridiagonal coefficient matrix [A], as seen in FIG. 22.

FIG. 22 is a matrix diagram 2200 illustrating an exemplary tridiagonal coefficient matrix [A]. Here, [A]{X}={b} is a set of m linear equations and m unknowns. The tridiagonal coefficient matrix [A] organizes the m simultaneous-linear equations having the m number of unknown variables into a tridiagonal system of linear equations, a coefficient matrix of the tridiagonal system of linear equations having 2's along an entire main diagonal of the coefficient matrix, negative 1's along diagonals immediately adjacent to the main diagonal, all other entries of the coefficient matrix being zero, and a right-hand-side vector {b} comprising a first entry of 1, a last entry of N denoting NV, which is N times a maximum allowable angular-velocity V of the motor at a one hundred percent torque constant K, and all other entries of the right-hand-side vector {b} being zero. The reason for the tridiagonal matrix is because each "interior" winding-configuration "j" in the electric motor is only affected by its neighboring winding-configuration "j−1" and "j+1," hence the coefficient matrix [A] has zero values everywhere except in the main diagonal, which is all 2's (e.g., the number "2"), and diagonals immediately adjacent to the main diagonal, which are both all −1's (e.g., the negative number "1"). All other elements in coefficient matrix [A] are zero. In other words, the solution to the problem that is being solved uses matrix algebra with a characteristic form, namely a tridiagonal matrix. The coefficient matrix [A] is symmetric as well as tridiagonal. $X_1, X_2, X_3, \ldots X_m$ are shown as the unknown variable of X, and the right hand side vector {b} shows 1, 0, 0, 0, 0, . . . , N respectively. It should be noted that all examples described herein are special cases of this generalized matrix approach. For example, the first derivation for tables of FIGS. 11-13, N=3 and m=3 (m+2=5 winding-configuration motor). Please note that m is an independent integer and N has any positive value greater than unity (N need not be an integer).

One of the values of coefficient matrix [A] being both symmetric and tridiagonal is that a simple solution algorithm can be written, one decidedly less complicated than if coefficient matrix [A] was fully populated with non-zero elements which did not fit any pattern. For example, a solution algorithm may begin with the calculation of factors $F_j$ and $G_j$. The order of the progression is starting from index j equals 1 and ending at j equals m. In other words, the calculation of factors $F_j$ and $G_j$ are calculated by the following recursive algorithm:

$$F_1 = 2 \text{ and } G_1 = \tfrac{1}{2}, \quad (41),$$

$$F_j = 2 - 1/F_{j-1} \text{ from } j=2 \text{ to } m, \quad (42),$$

$$G_j = G_{j-1}/F_j \text{ from } j=2 \text{ to } m-1, \text{ and} \quad (43),$$

$$G_m = (N + G_{m-1})/F_m, \quad (44),$$

as will be shown below in FIG. 25.

The elements of solution vector {$X_j$} are now obtained, with the order of the progression in the reverse direction, namely starting from index j equals m and ending at j equals 1, $X_m = G_m$, $X_j = G_j + X_{j+1}/2$. Thus, the solution vector {$X_j$} is now in a simple algorithm, for m≥2 (e.g., m is greater than and/or equal to two), since that is the lowest value of m yielding a coefficient matrix [A] with multiple simultaneous linear equations and multiple unknowns. If m=1, there is only one equation to be solved and the above upper-triangularization and back-substitution algorithm is unnecessary. Also, the solution for m=1 from tables as seen in FIG. 18-20, is already obtained, being X=(N+1)/2.

At this point, a need exists to analyze the case for m=1 equation and m=1 unknown. The following Fig.'s give the construction of the switching algorithm, assuming that the final angular-velocity is NV (N is an undetermined constant greater than unity) and m+2=3 winding-configurations are used, and there is only m=1 equation and m=1 unknown, hence the tridiagonal matrix approach of FIG. 21 is not used for a simple algebra problem. FIG. 23, below, is established with the help of FIG. 20, which has already been discussed.

FIG. 23 is a table diagram 2300 illustrating an exemplary profile of the optimal switching calculation for optimizing a dynamic reconfiguration-switching between individual motor windings in a 3-winding-configuration motor for trading off acceleration in favor of increased angular-velocity between each successive winding-configuration where X=(N+1)/2. In FIG. 23, the variable X, which is an unknown coefficient and is unitless, and the algebraic expression for total time has the units of time from the quotient V/A. The voltage constant and torque constant show a maximal value of K, and then decrease in value to 2K/(N+1), and finally to K/N for the three winding-configurations progressing from winding-configuration-1 where all motor windings are used, winding-configuration-2 and winding-configuration-3 in successive order. The angular-acceleration shows a maximal value of A, and then decreases in value to 2A/(N+1), and finally to A/N for the three winding-configurations progressing from winding-configuration-1, winding-configuration-2 and winding-configuration-3 in successive order. The delta angular-velocity is V, (N−1)V/2, and (N−1)V/2 for the three winding-configurations progressing from winding-configuration-1, winding-configuration-2 and winding-configuration-3 in successive order. The total angular-velocity increases from V, to (N−1)V/2, and finally NV for the three winding-configurations progressing from winding-configuration-1, winding-configuration-2 and winding-configuration-3 in successive order. The total angular velocity is the sum of the respective delta angular velocities, hence the total angular velocity for winding-configuration-2 is (N+1)V/2=V+(N−1)V/2, and the total angular velocity for winding-configuration-3 is NV=V+(N−1)V/2+(N−1)V/2. The delta time is $$(V/A) = T, \frac{(N^2-1)T}{4}, \text{ and } \frac{(N^2-N)T}{2},$$

giving a total time to accelerate up to an angular-velocity of $$NV \text{ as } \frac{(3N^2 - 2N + 3)T}{4},$$

which is faster than the $N^2T$ required without coil switching, again, where $$T = V/A \text{ and } \frac{(3N^2 - 2N + 3)T}{4},$$

is the total time, for the three winding-configurations progressing from winding-configuration-1, winding-configuration-2 and winding-configuration-3 in successive order.

Thus, as illustrated in Fig.'s above, in one embodiment, the present invention performs this process for a motor with WC-winding-configurations, where WC=m+2, of the electric motor in order to optimally achieve an angular-velocity NV which is N times a capability of the electric motor with a one hundred percent torque constant and voltage constant K. Calculating an optional time for performing the dynamic reconfiguration-switching by first finding a total time for acceleration to an angular velocity of NV and differentiating that total time with respect to vector of unknowns {X} and setting each of those first derivatives to zero to find an optimal value of the vector of unknowns {X} to minimize the total time. Finally, taking a second derivative of that total time with respect to vector of unknowns {X}, wherein a positive-second derivative indicates that the value of the vector of unknowns {X} indeed minimizes and optimizes the total time for performing the dynamic reconfiguration-switching, where vector of unknowns {X} represents one or more unknowns used for subdividing the one hundred percent torque constant and voltage constant of the electric motor into smaller units of a torque constant and a voltage constant (Kt=Kv in SI units) which allows the electric motor to go faster than V angular-velocity and up to an angular-velocity of NV where V is a maximum angular-velocity achieved with the one hundred percent torque constant, and N is an arbitrary value greater than 1, where WC is the a number of possible winding-configurations of the electric motor, and WC=m+2, where m is the number of equations and number of unknowns being solved for.

Figure 24A:
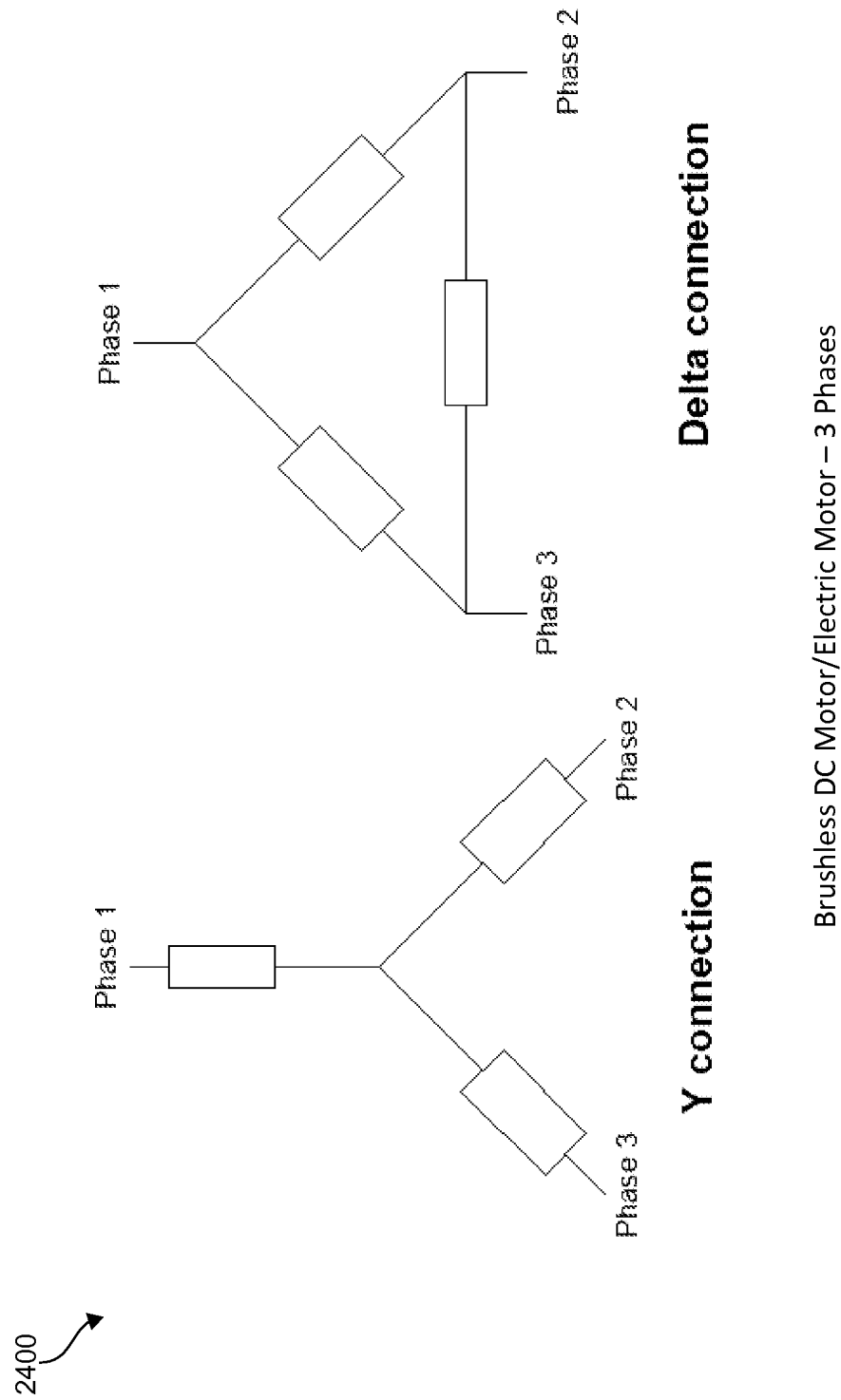
FIG. 24A is a block diagram illustrating a Y-connection and a Delta Connection a brushless DC motor and/or electric motor with 3 phases.
Figure 24C:
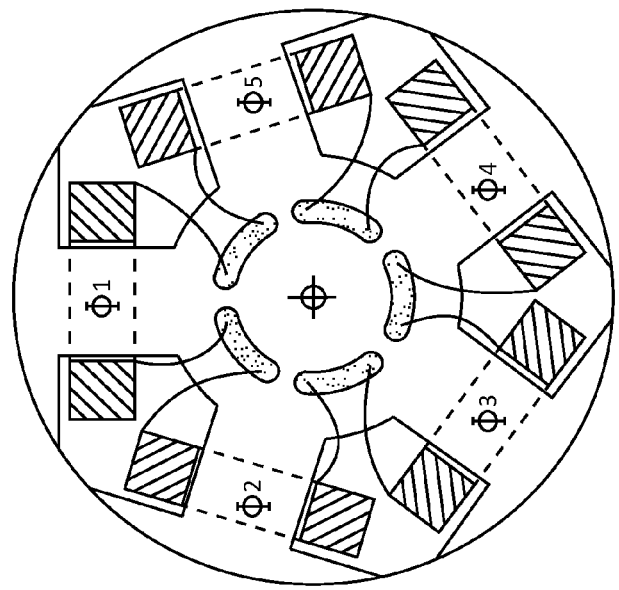
FIG. 24B-C are block diagrams of views through rotors of an electric motor.
Figure 24B:
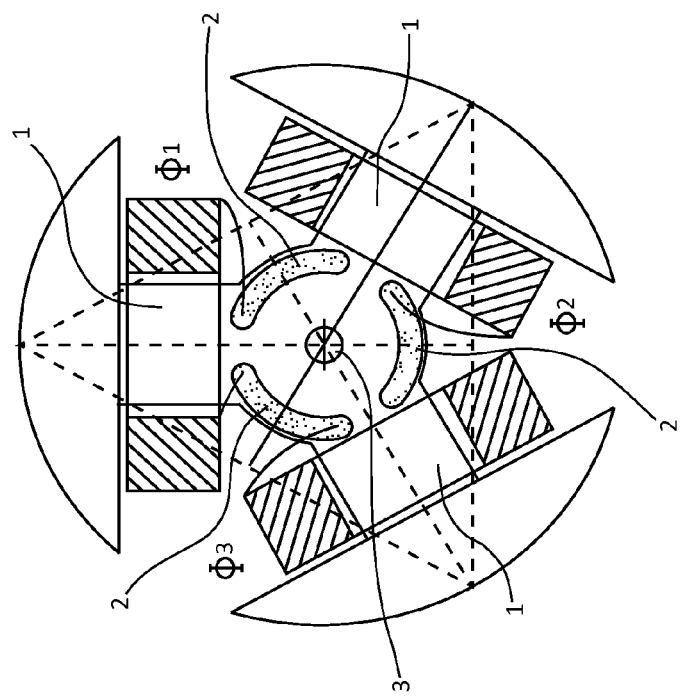

FIG. 24A is a block diagrams 2400 showing wye and delta connection (e.g., Y-connection and a Delta Connection) for a brushless dc motor and/or an electric motor. FIG. 24B-C are block diagrams of views through rotors of an electric motor. As mentioned previously, the optimal dynamic-reconfiguration switching of individual motor winds (e.g., coils) within an electric motor may be performed with either a wye (Y) or a delta connection. FIG. 24A illustrates both the wye and delta connection. For example, in one embodiment, by way of example only, the electric motor may include a stator, including three windings, spaced at 120 degree electrical from one another, for imparting a torque on a rotor. The torque imparted on the rotor causes the rotor to rotate. Those skilled in the art of motors and generators appreciate the efficiency, economy and simplicity of electric motors wherein there is no actual physical contact between the stator windings and the rotor. In order to effectuate the operation of the motor, a properly timed and spaced magnetic field is synthesized in the stator windings, which imparts a torque on the rotor and causes the rotor to rotate. The electric motor may be permanently configured in one of two basic configurations, either a wye connection or a delta connection, as seen in FIG. 24A. The electric motor with windings configured in the delta configuration can operate at a greater speed than the same windings configured in the wye configuration. However, the electric motor with windings configured in the wye configuration can operate with a greater torque at low speeds than the same windings configured in the delta configuration.

Moreover, the illustrated embodiments as described in herein may be applied to a variety of types of electric motors (e.g., an electric motor used in the automotive industry). For example, in one type of electric motor, the electric motor may be comprised of an armature bearing three windings. The armature rotates in a magnetic field and current is generated in the three windings and drawn from them in turn through brushes. Such an electrical motor is shown in FIG. 24B. In one embodiment, a motor armature comprises a rotor having three equiangularly spaced poles 1 about each of which is wound a coil winding Φ. Coil windings Φ are connected to commutator segments 2 which in turn are contacted by brushes (not shown). Such a motor may be used to cause rotation by applying current to the windings, which then rotate within a magnetic field, or may be used in reverse to generate current from rotation of the windings within the magnetic field. For example, a motor with three coil windings Φ1, Φ2 and Φ3 are all identical and have identical numbers of turns in each winding. When the motor rotates, the current that flows through each winding is therefore identical. One way of providing a feedback control signal is to form the three coil windings Φ with a differing numbers of turns. This is shown in FIG. 24B where winding Φ1-1 is formed with a reduced number of turns in comparison with windings Φ2 and Φ3. The effect of this is that as the motor rotates the current that flows through winding Φ1-1 is different from that which flows through windings Φ2 and Φ3. This difference can be detected and used to count the number of rotations of the motor, and also to mark and define the beginning of rotation cycles of the motor. This information can be used in a number of ways to accurately control the rotation of the motor in a number of applications as discussed above. The embodiment as described above has three poles, however it will be understood that this is by no means essential and the motor may have any odd number of poles. For example, as illustrated in FIG. 24C, an electric motor may have a more than three poles (e.g., five poles). The electric motor may be comprised with multiple coil windings. The windings may also have an equal number of turns on one winding. Any one or more of these poles could be provided with a reduced number of turns compared to a regular coil winding. In short, the illustrated embodiments may be applied to a variety of types and variations of electric motors. It should be noted that an electric motor has been described in FIG. 24B-C by way of example only and such rotors/winding, as used in the present invention, are not limited to the electric motor, but other motors commonly used in the art having the various rotors/windings may also be applied to accomplish the spirit and purposes of the present invention.

Figure 25:
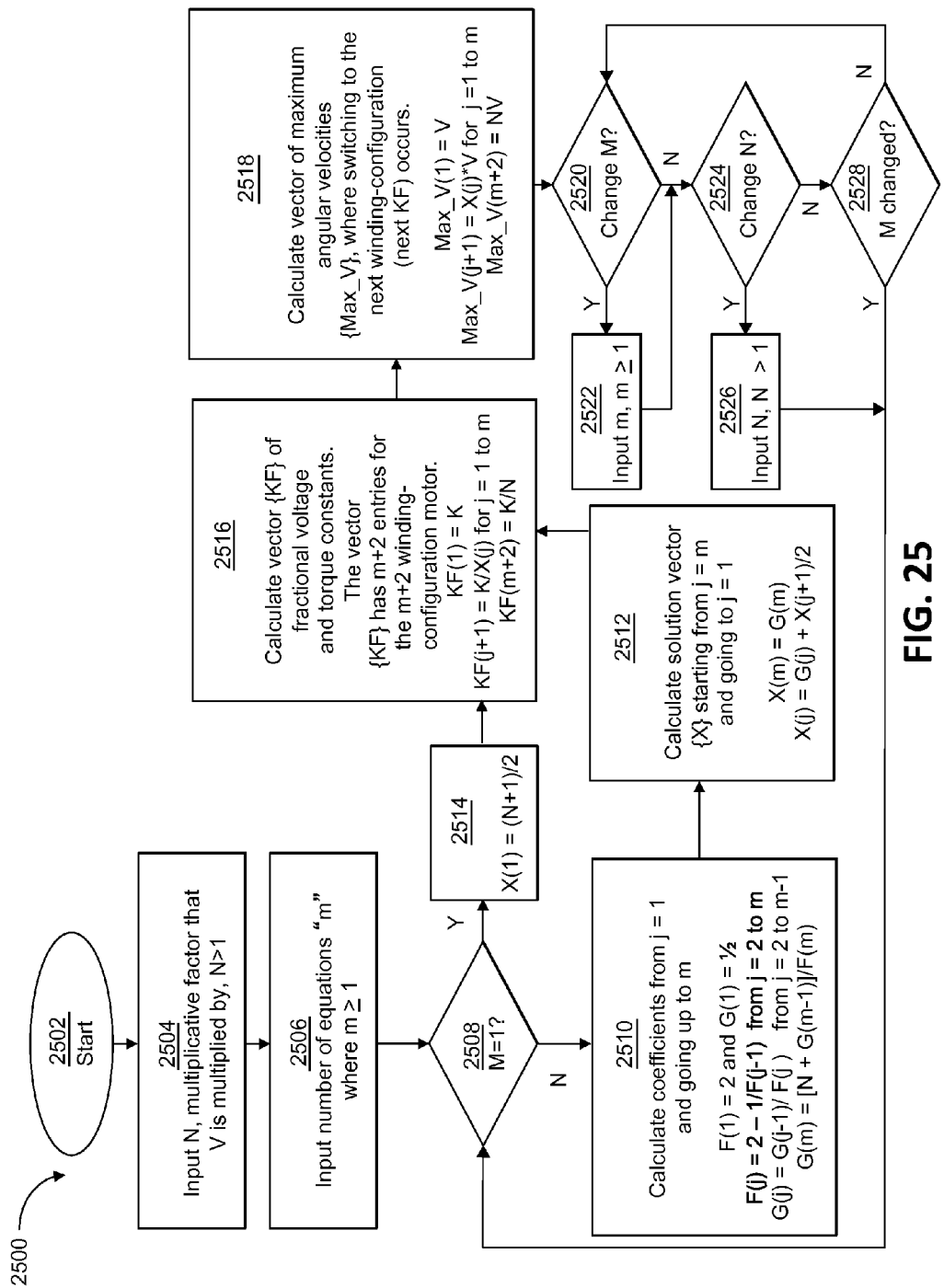
FIG. 25 is a flowchart illustrating an exemplary method of an exemplary optimal switching algorithm.

FIG. 25 is a flowchart illustrating an exemplary method 2500 of an exemplary optimal switching algorithm. The optimizing switching algorithm solutions, as seen above in FIGS. 20, 21, and 23 are summarized in method 2500, where the algorithm is solving for {X}, {KF}, and {Max_V}. The method 2500 begins (step 2502). The method 2500 inputs an initial value for N, the multiplicative factor by which V is multiplied, where N is greater than one "1" (step 2504). The method 2500 inputs an initial value for the number of equations "m," where m is greater than one "1" (step 2506). The method 2500 determines if m is equal to one (step 2508). If no, the method 2500 calculates the coefficients from j equals one "1" (e.g., j=1) up to m (step 2510). As illustrated above in FIG. 22, the calculation of factors $F_j$ and $G_j$ are calculated by the following recursive algorithm:

$$F_1 = 2 \text{ and } G_1 = \frac{1}{2}, \tag{41}$$

$$F_j = 2 - 1/F_{j-1} \text{ from } j=2 \text{ to } m, \tag{42}$$

$$G_j = G_{j-1}/F_j \text{ from } j=2 \text{ to } m-1, \text{ and} \tag{43}$$

$$G_m = (N + G_{m-1})/F_m. \tag{44}$$

From step 2510, the method 2500 then calculates the solution vector {X} starting from j=m and going down to j=1, X(m)=G(m) and X(j)=G(j)+X(j+1)/2 (step 2512). Returning to step 2508, if yes the method 2500 the variable X(1) is set equal to (N+1)/2 (step 2514). From both steps 2512, and 2514, the method 2500 calculates the vector {KF} of fractional voltage and torque constants (step 2516). The vector {KF} has m+2 entries for the m+2 winding-configuration motor. KF(1)=K, KF(j+1)=K/X(j) for j=1 to m, and KF(m+2)=K/N. Next, the method 2500 calculates the vector of maximum angular velocities {Max_V}, where switching to the next winding-configuration (next KF) occurs (step 2518), with Max_V(1)=V, Max_V(j+1)=X(j)*V for j=1 to m, and Max_V(m+2)=NV. In one embodiment, the method 2500 ends at step 2518, whereby the method 2500 for dynamic coil switching is configured once for a motor and never changed again.

Figure 26:
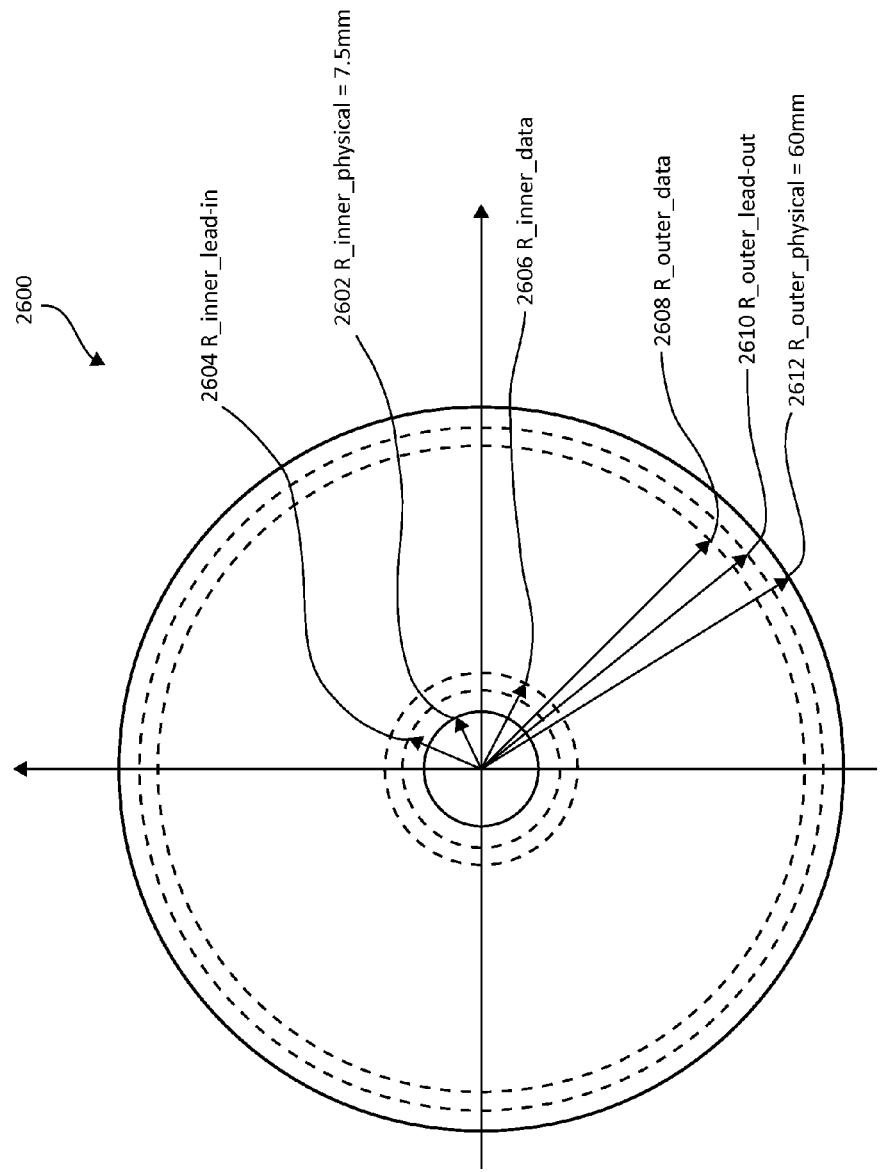
FIG. 26 is a block diagram illustrating a DVD optical disk.

One example of method 2500 could apply to DVD-ROM and Blu-Ray-ROM disk drives, both of which read data from the respective optical disk at a constant linear velocity (CLV). The layout of a DVD-ROM disk 2600 is shown in FIG. 26, where FIG. 26 is a layout diagram of an optical disk 2600, with dimensions coming from ECMA-267, entitled 120 *mm DVD-Read-Only Disk*. The R_outer_physical of the DVD disk, 2612, equals 60 mm (120 mm diameter disk) and the R_inner_physical of the DVD disk, 2602, equals 7.5 mm (15 mm diameter central hole). Blu-Ray disks have the same physical inner and outer radii, so that DVD disks and Blu-Ray disks may be played on the same drive. DVD disks have a lead in zone beginning at 2604 R_inner_lead-in at 22.6 mm. The data begins at 2606 R_inner_data, at 24 mm. The data continues to 2608 R_outer_data, at 57.5 mm to 58 mm, where the lead-out zone begins. The lead-out zone terminates at 2610 R_outer_lead-out, at approximately 58.5 mm. Method 2500 allows the motor of the disk player to have a torque constant and voltage constant (Kt=Kv in SI units) commensurate to the outermost active radius of the disk, 2610 R_outer_lead-out, and the constant linear velocity (CLV) of the disk. CLV=V*R_outer_lead-out=N*V*R_inner_lead-in. Solving for N for a DVD disk, we get N=R_outer_lead-out/R_inner_lead-in =58.5/22.6=2.6. N may be rounded up to 3 to account for drive, motor, and disk tolerances, giving a practical application of FIG. 8, if m=1 equations are chosen. As the drive reads data from the inner radius outwards, the disk is slowed down and the algorithm shown in FIG. 8 is utilized from bottom to top. Then, if the disk is dual layer, and additional data is read from the outer radius inwards, the algorithm shown in FIG. 8 is utilized from top to bottom.

However, method 2500 permits an additional embodiment, whereby the algorithm for dynamic coil switching is itself dynamically reprogrammable, thus allowing continual change of multiplicative factor N and/or number of equations m. Method 2500 continues to step 2520 where a check is made whether to increase the number of equations m, as that permits higher performance, or to decrease the number of equations m, for lower performance. If the answer is yes in step 2520, method 2500 transfers to step 2522 and the new value of m is obtained, where m is greater than or equal to one (e.g., m≥1), and a flag is set that m has been changed. If the answer is no in step 2520, method 2500 transfers to step 2524, where a check is made whether to increase multiplicative factor N for higher maximum motor speed and simultaneously less motor torque, or to reduce multiplicative factor N for lower maximum motor speed, and simultaneously more motor torque (step 3524). If the answer is yes in step 2524, method 2500 transfers to step 2526 and a new value of m (where m is greater than m, m>1) is obtained and method 2500 proceeds to step 2508 to begin recalculation of the switching algorithm. If the answer is no in step 2524, method 2500 transfers to step 2528 where the flag is checked from step 2520. If the answer is yes in step 2528, method 2500 proceeds to step 2508 to begin recalculation of the switching algorithm. If the answer is no in step 2528, the algorithm loops back to step 2520, searching for changes in m and N.

There are numerous applications for dynamically altering control method 2500 with additional steps 2520-2528. In one embodiment, the constant angular-velocity of disks in a hard disk drive (HDD) is run at a low angular-velocity V to save on power expended during low disk SIOs (Start Input/Output Activities). Running at a low angular-velocity V permits the storage array of hard disk drives to address workload as the storage array is not in a sleep mode but it is clearly in a power-saving mode. As the queue of pending SIOs builds, N is dynamically increased to accommodate the increased workload at the higher angular-velocity of NV. Once the workload becomes quiescent, the value of N is correspondingly reduced.

Another application for dynamically altering control method 2500 involves automobiles, trucks, and motorcycles. Parents may wish to downgrade the performance of the car, if their teenage son or daughter was taking out the car, and V (an angular-velocity) was equivalent to 15 MPH, then the parent or guardian could set N=4, meaning that 4V=60 MPH and the car would be speed limited to 60 MPH (fast enough for any teenage driver). Additionally, the motor could have a limited number of winding-configurations (e.g., switching-states), say m+2=3, meaning that the car would take longer to accelerate to the maximum velocity (the automotive equivalent of a 3-speed transmission) rather than m+2=5 (for example) which would be reserved for the parents (the automotive equivalent of a 5-speed transmission). Thus, the parents have tuned down the performance of the car, given the lack of experience of the driver. The parents would have a password, one allowing the parents to set N=5 (allowing the parents to go 75 MPH) and m+2=5 (faster acceleration). The idea here is not that we merely have a control algorithm for coil switching "on the fly", but that algorithm itself can be reconfigured on the fly (nearly instantaneously), depending upon (a) age of the driver, (b) driving conditions such as weather, and (c) time of day. The car could go to a lower performance mode for night driving (3N=45 MPH), especially if the weather was bad and road traction was poor due to rain, snow, or ice.

The embodiments are going beyond steps 2502-2518 of method 2500 of simply dynamically reconfiguring the motor coils. Now the present invention is dynamically reconfiguring the algorithm/calculations itself, which is easily done, given the tridiagonal set of equations has an easily programmed solution that avoids the complexity of inverting an m-by-m matrix because the tridiagonal [A] matrix is "sparse" (mostly zeros). Yet another embodiment is that the maximum velocity of a car is determined by N*V*wheel radius. N could be fed to the car via wireless communication such as cell phone telepathy, or Bluetooth communication, or GPS-location, and thus, speeding would be impossible in school zones, construction zones, residential streets, etc. Bluetooth is an advantageous method of communication, given its intentionally short-range distance of communication. Essentially, the car would receive the legal value of N via Bluetooth transmitters in the roadway, or via GPS-location, and the maximum velocity of the car is set that way. N=1 gives 15 MPH for school zones. N=2 or N=3 gives 30 or 45 MPH for residential or business zones. N=4 (60 MPH) or N=5 (75 MPH) gives "expressway" speeds. Bluetooth or GPS-location gives N to the car, and the car resets its algorithm in a fraction of a second, to accommodate the newly allowed speed limit). To allow for varying models of cars, the same Bluetooth network may send out N based on the model of the car, e.g. Honda_N=2, Toyota_N=3, Ford_N=1, F150_N=4, etc.

In yet another automobile, truck, bus, or motorcycle embodiment, if an accident occurs, the Bluetooth network lowers the value of N to speed regulate motorists past the accident scene, to prevent massive chain reaction accidents, especially when visibility is limited.

In a medical embodiment, the DC brushless motor turns an Archimedes screw blood-flow assist of an artificial heart. The DC brushless motor could be held in place by being part of a medical stent used in arteries. As the oxygen content goes down, as measured by a medical oxygen sensor, N is dynamically increased to allow more blood flow through the lungs. Similarly, N could be increased for dental drill applications requiring a higher angular-velocity.

Figure 27:
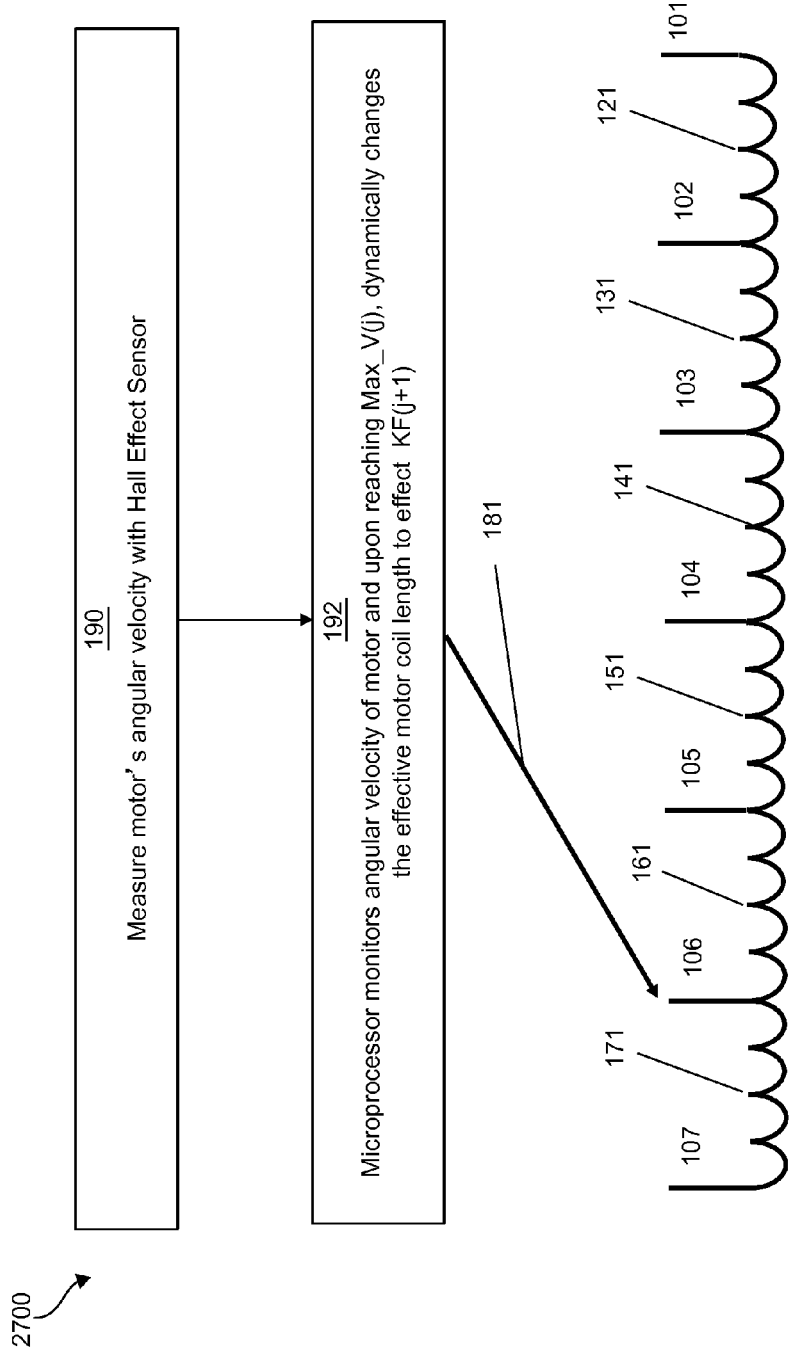
FIG. 27 is a block diagram of a servo system receiving information on updated values of N and m via wireless communication, such as cell phone telepathy, or Bluetooth, or GPS-location.

FIG. 27 is a block diagram 2700 illustrating an exemplary process for monitoring the angular-velocity of the electric motor. Using the Hall Effect Sensor 190, the electric motor's angular-velocity is measured. The microprocessors 192 monitors the angular-velocity of the electric motor, and upon reaching maximum angular velocities Max_(j) (shown as 171, 161, 151, 141, 121, and 121), the microprocessors dynamically changes the effective motor coil length to effect KF(j+1), with coils 107, 106, 105, 104, 103, 102, and 101.

Figure 28:
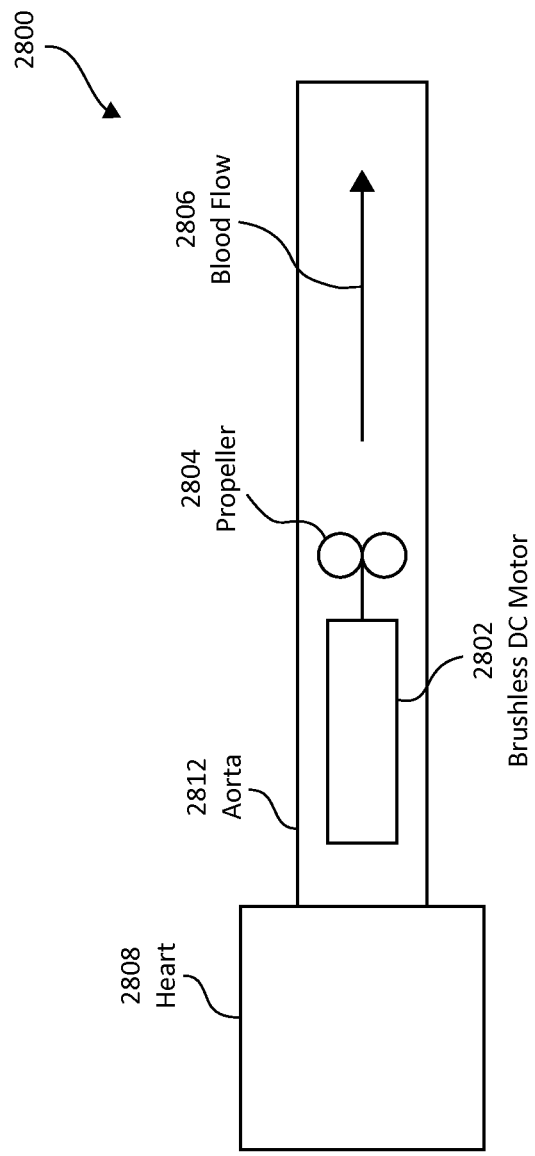
FIG. 28 is a block diagram illustrating an exemplary process for monitoring the angular-velocity of an electric motor.

FIG. 28 is a block diagram illustrating an exemplary motor used in a medical device 2800. Using a brushless DC motor 2802 with the various embodiments described herein to dynamically control the calculation function and the dynamic switching of the motors 2802 windings, the propeller 2804 of the motor 2802 is used to assist the blood flow 2806 in an aorta 2812 from the heart 2808 for a patient. It should be noted that the motor 2802 may be any type of motor, including but not limited to, an electric motor and/or a brushless DC motor. Also, it should be noted that the medical device 2800 may use a variety of motor types, depending upon the particular need of the patient and the specific medical device 2800. The medical device 2800 may use the motor 2802, which employs the various embodiments described herein, in a variety of settings and services to assist the health and welfare of a patient. For example, an electric motor 2802 may be used in a medical device, such as an electric wheel chair powered by the motor 2802 while employing the various methods described herein, such as in FIG. 2500 which controls the calculation function on the fly.

Figure 29:
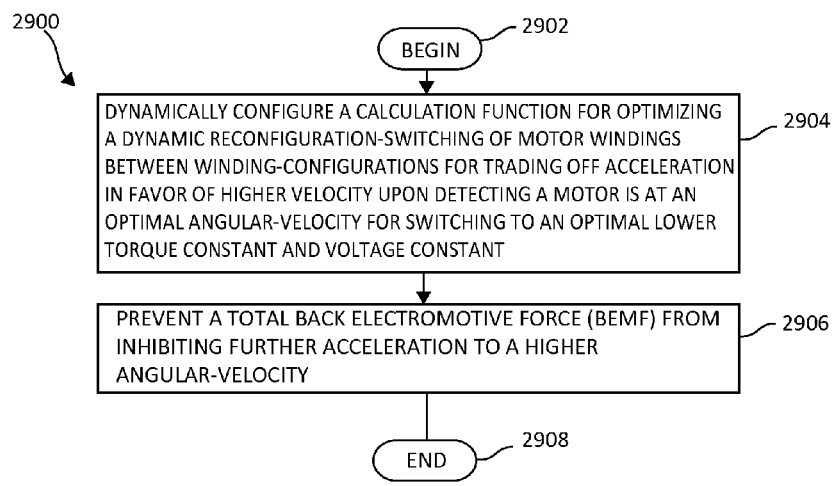
FIG. 29 is a flowchart illustrating an exemplary method of dynamically configuring a calculation function for optimizing a dynamic reconfiguration-switching of motor windings in a motor.

FIG. 29 is a flowchart illustrating an exemplary method 2900 for dynamically configuring a calculation function for optimizing a dynamic reconfiguration-switching of motor windings in a motor. The method 2900 begins (step 2902) by dynamically configuring a calculation function for optimizing a dynamic reconfiguration-switching of motor windings between winding-configurations for trading off acceleration in favor of higher velocity upon detecting the electric motor is at an optimal angular-velocity for switching to an optimal lower torque constant and voltage constant (step 2904). The total back electromotive force (BEMF) is prohibited from inhibiting further acceleration to a higher angular-velocity (step 2906). The method 2900 ends (step 2908).

Also, it should be noted that depending on the type of motor, additional embodiments of the present invention, as described above may be applied depending on the motor type. For example, the dynamic configuration of the calculation function may be applied to an electric motor in an electric vehicle. Thus, in one embodiment, the dynamic configuration of the calculation function may be applied to an electric motor in an electric vehicle for optimizing a dynamic reconfiguration-switching of motor windings between winding-configurations for trading off acceleration in favor of higher velocity upon detecting the electric motor in an electric vehicle is at an optimal angular-velocity for switching to an optimal lower torque constant and voltage constant. A check may be performed to determine if one motor of the electric vehicle is spinning faster than the electric vehicle's velocity divided by the wheel radius. If no, the total back electromotive force (BEMF) from inhibiting further acceleration to a higher angular-velocity is prohibited. If yes, a total back electromotive force (BEMF) from inhibiting further acceleration to a higher angular-velocity is utilized.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams can be implemented by computer program instructions. These computer program instructions may be provided to a processor of a general purpose computer, special purpose computer, or other programmable data processing apparatus to produce a machine, such that the instructions which execute via the processor of the computer or other programmable data processing apparatus, create means for implementing the functions/acts specified in the flowchart and/or block diagram block or blocks.

These computer program instructions may also be stored in a computer readable medium that can direct a computer, programmable data processing apparatus, or other device to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or device to cause a series of operational steps to be performed on the computer, other programmable apparatus or device, to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. An system for switching motor windings within a motor, the system comprising:
   the motor having a plurality of motor windings,
   a plurality of switches for controlling a direction of current through the plurality of motor windings of the motor, and
   a processor device in communication with the plurality of switches and the motor, wherein the processor device:
      dynamically configures a calculation function that optimizes a dynamic reconfiguration-switching of a plurality of motor windings between a plurality of states for trading off acceleration in favor of higher velocity upon detecting the motor is at an optimal angular velocity for switching to an optimal lower torque constant thereby preventing a total back electromotive force (BEMF) from inhibiting further acceleration to a higher angular velocity, and
      wirelessly communicating a maximum velocity value computed in the calculation function via a plurality of broadcasting options into a servo system in one of a plurality of motors.

2. The system of claim 1, wherein the processor device sets a multiplicative factor and an m number of equations for dynamically configuring the calculation function, wherein the performance of the electric motor is influenced by the multiplicative factor and the m number of equations.

3. The system of claim 1, wherein the processor device performs one of:
   continuously changing a multiplicative factor and an m number of equations by dynamically configuring the calculation function, and
   determining if a number of the m number of equations of the calculation function are required to be one of increased for higher performance and decreased for lower performance, wherein if the number of the m number of equations of the calculation function are required to be one of increased and decreased:
      obtaining a new one of the m number of equations and setting a flag indicating the changing of the m number of equations, wherein the m number of equations is greater than one, and
   wherein if the number of the m number of equations of the calculation function are not required to be one of increased and decreased:
      determining if the multiplicative factor is required to be increased for increasing a maximum speed of the motor while simultaneously increasing torque of the motor, wherein if the multiplicative factor is required to be increased:
         obtaining a new value for the multiplicative factor and reconfiguring the calculation function, wherein the new value for the multiplicative factor is greater than 1, and
      if the multiplicative factor is not required to be increased:
         determining if the flag that indicates the changing of the m number of equations is set.

4. The system of claim 1, wherein the processor device wirelessly communicating a maximum velocity value computed in the calculation function via a plurality of broadcasting options with the assistance of a global positioning system for determining an angular velocity for varying characteristics for one of a plurality of electric motors, wherein the plurality of broadcasting options include at least a cell phone telepathy and Bluetooth communication.

5. The system of claim 1, wherein the processor device allows the user to adjust the multiplicative factor and the m number of equations for controlling the performance of the electric motor.

6. The system of claim 1, wherein the processor device monitors angular velocity of the electric motor for determining when to dynamically configuring the calculation function, wherein a length of the plurality of motor windings are change upon reaching a maximum angular velocity.

7. The system of claim 1, wherein the motor is one of:
a plurality of motors,
is incorporated into a tape drive system,
is incorporated into an optical disc drive (ODD) system,
is incorporated into a hard disk drive (HDD) system,
is incorporated into a plurality of medical devices, and
is incorporated into at least one of a plurality of motorized vehicles.

8. A computer program product for switching motor windings within a motor using a processor device, the computer program product comprising a non-transitory computer-readable storage medium having computer-readable program code portions stored therein, the computer-readable program code portions comprising:
a first executable portion that dynamically configures a calculation function that optimizes a dynamic reconfiguration-switching of plurality of motor windings between a plurality of states for trading off acceleration in favor of higher velocity upon detecting the electric motor is at an optimal angular velocity for switching to an optimal lower torque constant thereby preventing a total back electromotive force (BEMF) from inhibiting further acceleration to a higher angular velocity; and
a second executable portion that wirelessly communicating a maximum velocity value computed in the calculation function via a plurality of broadcasting options into a servo system in one of a plurality of motors.

9. The computer program product of claim 8, further including a third executable portion that sets a multiplicative factor and an m number of equations for dynamically configuring the calculation function, wherein the performance of the electric motor is influenced by the multiplicative factor and the m number of equations.

10. The computer program product of claim 8, further including a third executable portion that performs one of:
continuously changing a multiplicative factor and an m number of equations by dynamically configuring the calculation function, and
determining if a number of the m number of equations of the calculation function are required to be one of increased for higher performance and decreased for lower performance, wherein if the number of the m number of equations of the calculation function are required to be one of increased and decreased:
obtaining a new one of the m number of equations and setting a flag indicating the changing of the m number of equations, wherein the m number of equations is greater than one, and
wherein if the number of the m number of equations of the calculation function are not required to be one of increased and decreased:
determining if the multiplicative factor is required to be increased for increasing a maximum speed of the motor while simultaneously increasing torque of the motor, wherein if the multiplicative factor is required to be increased:
obtaining a new value for the multiplicative factor and reconfiguring the calculation function, wherein the new value for the multiplicative factor is greater than 1, and
if the multiplicative factor is not required to be increased:
determining if the flag that indicates the changing of the m number of equations is set.

11. The computer program product of claim 8, further including a third executable portion that wirelessly communicates a maximum velocity value computed in the calculation function via a plurality of broadcasting options with the assistance of a global positioning system for determining an angular velocity for varying characteristics for one of a plurality of electric motors, wherein the plurality of broadcasting options include at least a cell phone telepathy and Bluetooth communication.

12. The computer program product of claim 8, further including a third executable portion that allows the user to adjust the multiplicative factor and the m number of equations for controlling the performance of the electric motor.

13. The computer program product of claim 8, further including a third executable portion that monitors angular velocity of the electric motor for determining when to dynamically configuring the calculation function, wherein a length of the plurality of motor windings are change upon reaching a maximum angular velocity.

14. The computer program product of claim 8, wherein the motor is one of:
a plurality of motors,
is incorporated into a tape drive system,
is incorporated into an optical disc drive (ODD) system,
is incorporated into a hard disk drive (HDD) system,
is incorporated into a plurality of medical devices, and
is incorporated into at least one of a plurality of motorized vehicles.

15. A method for switching motor windings within a motor using a processor device, the method comprising:
dynamically configuring a calculation function that optimizes a dynamic reconfiguration-switching of a plurality of motor windings between a plurality of states for trading off acceleration in favor of higher velocity upon detecting the motor is at an optimal angular velocity for switching to an optimal lower torque constant thereby preventing a total back electromotive force (BEMF) from inhibiting further acceleration to a higher angular velocity; and
wirelessly communicating a maximum velocity value computed in the calculation function via a plurality of broadcasting options into a servo system in one of a plurality of motors.

16. The method of claim 15, further including setting a multiplicative factor and an m number of equations for dynamically configuring the calculation function, wherein the performance of the motor is influenced by the multiplicative factor and the m number of equations.

17. The method of claim 15, further including performing one of:
continuously changing a multiplicative factor and an m number of equations by dynamically configuring the calculation function, and
determining if a number of the m number of equations of the calculation function are required to be one of increased for higher performance and decreased for lower performance, wherein if the number of the m number of equations of the calculation function are required to be one of increased and decreased:
obtaining a new one of the m number of equations and setting a flag indicating the changing of the m number of equations, wherein the m number of equations is greater than one, and wherein if the number of the m number of equations of the calculation function are not required to be one of increased and decreased:

determining if the multiplicative factor is required to be increased for increasing a maximum speed of the motor while simultaneously increasing torque of the motor, wherein if the multiplicative factor is required to be increased:

obtaining a new value for the multiplicative factor and reconfiguring the calculation function, wherein the new value for the multiplicative factor is greater than 1, and if the multiplicative factor is not required to be increased:

determining if the flag that indicates the changing of the m number of equations is set.

18. The method of claim 15, further including wirelessly communicating a maximum velocity value computed in the calculation function via a plurality of broadcasting options with the assistance of a global positioning system for determining an angular velocity for varying characteristics for one of a plurality of electric motors, wherein the plurality of broadcasting options include at least a cell phone telepathy and Bluetooth communication.

19. The method of claim 15, further including allowing a user to adjust the multiplicative factor and the m number of equations for controlling the performance of the motor.

20. The method of claim 15, further including monitoring angular velocity of the electric motor for determining when to dynamically configuring the calculation function, wherein a length of the plurality of motor windings are changed upon reaching a maximum angular velocity.

21. The method of claim 15, wherein the motor is one of:
    a plurality of motors,
    is incorporated into a tape drive system,
    is incorporated into an optical disc drive (ODD) system,
    is incorporated into a hard disk drive (HDD) system,
    is incorporated into a plurality of medical devices, and
    is incorporated into at least one of a plurality of motorized vehicles.

* * * * *